US012382519B2

(12) United States Patent
Freda et al.

(10) Patent No.: US 12,382,519 B2
(45) Date of Patent: *Aug. 5, 2025

(54) METHOD FOR EFFICIENT PAGING FOR USER EQUIPMENT TO NETWORK RELAYS

(71) Applicant: InterDigital Patent Holdings, Inc., Wilmington, DE (US)

(72) Inventors: Martino Freda, Laval (CA); Moon Il Lee, Melville, NY (US); Paul Marinier, Brossard (CA); Tuong Hoang, Montreal (CA); Jaya Rao, Montreal (CA); Oumer Teyeb, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/284,247

(22) PCT Filed: Mar. 29, 2022

(86) PCT No.: PCT/US2022/022258
§ 371 (c)(1),
(2) Date: Sep. 26, 2023

(87) PCT Pub. No.: WO2022/212311
PCT Pub. Date: Oct. 6, 2022

(65) Prior Publication Data
US 2024/0163934 A1 May 16, 2024

Related U.S. Application Data

(60) Provisional application No. 63/249,832, filed on Sep. 29, 2021, provisional application No. 63/185,634,
(Continued)

(51) Int. Cl.
*H04W 76/10* (2018.01)
*H04W 68/02* (2009.01)
(Continued)

(52) U.S. Cl.
CPC ........... *H04W 76/10* (2018.02); *H04W 68/02* (2013.01); *H04W 76/28* (2018.02); *H04W 88/04* (2013.01)

(58) Field of Classification Search
CPC ..... H04W 76/10; H04W 68/02; H04W 76/28; H04W 88/04; H04W 76/27; H04W 76/14; H04W 48/12
See application file for complete search history.

(56) References Cited

U.S. PATENT DOCUMENTS 12,048,050 B2 * 7/2024 Wang .................... H04W 76/28
2018/0077624 A1 3/2018 Jung et al.
(Continued)

FOREIGN PATENT DOCUMENTS

EP 3703411 A1 9/2020
WO WO-2022007632 A1 * 1/2022
WO WO-2022178728 A1 * 9/2022

OTHER PUBLICATIONS

3GPP TR 36.746 v15.1.1 Study on further enhancement to LTE D2D, UE to network relays for internet of Things (IoT) and wearables (Release 15) (Apr. 2018) (Year: 2018).*
(Continued)

Primary Examiner — Nizar N Sivji
(74) Attorney, Agent, or Firm — Flaster Greenberg, P.C.

(57) ABSTRACT

A method performed by a relay wireless transmit/receive unit (WTRU) includes receiving an indication of a change in state of a remote WTRU having a paging link with the relay WTRU, receiving a paging message from a network. The paging message includes a system information (SI) change
(Continued)

indication, wherein the SI change indication indicates an availability of updated SI information from the network for the remote WTRU. The relay WTRU transmits the updated SI information to the remote WTRU based on the received indication of a change in state of the remote WTRU.

13 Claims, 13 Drawing Sheets

Related U.S. Application Data filed on May 7, 2021, provisional application No. 63/167,307, filed on Mar. 29, 2021.

(51) Int. Cl.
*H04W 76/28* (2018.01)
*H04W 88/04* (2009.01)

(56) References Cited

U.S. PATENT DOCUMENTS

| | | | |
|---|---|---|---|
| 2019/0281127 A1* | 9/2019 | Schmidt | H04L 67/51 |
| 2021/0195503 A1* | 6/2021 | Tang | H04W 68/02 |
| 2022/0132464 A1* | 4/2022 | Agiwal | H04W 24/08 |
| 2023/0180343 A1* | 6/2023 | Park | H04W 76/28 |
| 2023/0328689 A1* | 10/2023 | Ozturk | H04W 76/14 |
| | | | 455/458 |
| 2024/0196367 A1* | 6/2024 | Agiwal | H04W 76/28 |

OTHER PUBLICATIONS

3GPP TR 36.746 v15.1.1 (Apr. 2018)—3GPP Project; Technical Specification Group Radio Access Network; Study on further enhancement to LTE D2D, UE to network relays for internet of things and wearable (Release 15) (Year: 2018).*
Interdigital Inc: "Control Plane Aspects for UE to NW Relays", 3GPP Draft; R2-2009202, 3rd Generation Partnership Project, Mobile Competence Centre; 450 Route Des Lucioles; F-06921 Sophia-Antipolis Cedex; France, vol. RAN WGS, No. electronic; 202001101 Oct. 22, 2020; retrieved from Internet; URL:https://ftp.3gpp.org/tsg_ran/WG2_RL2/TSGR2_112-d/Docs/R2-2009202.zip (retrieved on Oct. 22, 2020) 5 pages.
3rd Generation Partnership Project (3GPP), "Technical Specification Group Radio Access Network; Study on further enhancements to LTE Device to Device (D2D), User Equipment (UE) to network relays for Internet of Things (IoT) and wearables; (Release 15)", 3GPP TR 36.746 V15.1.1, Apr. 2018, 55 pages.
3rd Generation Partnership Project (3GPP), "New SID: Study on NR sidelink relay", Document: RP-193253, revision of RP-193118, 3GPP TSG RAN Meeting #86, Sitges, Spain, Dec. 9, 2019, 5 pages.
LG: "Report of email discussion [97bis#18] [LTE/FeD2D]—System Information", 3GPP Draft; R2-1705767 Summary of Email Discussion 97BIS#18 LTEFED2D_System Information, vol. RAN WG2, No. Hangzhou, China; 2017-515-2017-519; May 6, 2017, 14 pages; Retrieved from the Internet on May 6, 2017; http://www.3gpp.org/ftp/tsg_ran/WG2_RL2/TSGR2_98/Docs/, 14 pages.
Mediatek Inc (Email Discussion Rapporteur): "Phase 1 [Post111-e]{627] [Relay] Remainig issues on L2 architecture", 3GPP Draft; R2-2009122, 3rd Generation Partnership project (3GPP), vol. RAN WG2, No. electronic; Nov. 2, 2020-Nov. 3, 20201, Oct. 23, 2020 (2020-10-230, https://ftp.3gpp.or/tsg_ran/WG2_RL2/TSGR2_112-e/Docs/R2-2009122.zip R2-2009122 Phase 1 summary, 25 pages.
CATT: "On-demand SI Delivery for Remote UE", 3GPP Draft; R2-2008922, 3rd Generation Partnership Project, Mobile Competence Centre; France vol. RAN WG2, No. Electronic; Nov. 2,-Nov. 13, 2020, Oct. 23, 2020; Retrieved from the Internet on Oct. 23, 2020: https://ftp.3gpp.org/tsg_ran/WG2_RL2/TSGR2_112-e/Docs/R2-2008922.zip R2-2008922 On-demand SI Delivery for Remote UE.docx, 4 pages.
3GPP TS 38.304 NR; User Equipment (UE) procedures in Idle mode and RRC Inactive state (Release 16) V16.3.0 (Dec. 2020), 39 pages.
3GPP TS 38.300—NR and NG-RAN Overall Description Stage 2 (V16.1.0), (Mar. 2020) 133 pages.
LTE: Evolved Universal Terrestrial Radio Access (E-UTRA) and Evolved Universal Terrestrial Radio Access Network (E-UTRAN); Overall description Stage 2 (3GPP TS 36.300 version 15.4.0 Release 15) (Apr. 2019), 363 pages (asbtract).
3GPP TS 36.300 V15.4.0 , "Evolved Universal Terrestrial Radio Access (E-UTRA) and Evolved Universal Terrestrial Radio Access Network (E-UTRAN) Overall description; Stage 2 (Release 15)", 3rd Generation Partnership Project; Technical Specification Group Radio Access Network, Dec. 2018, 363 pages.
3GPP TSG-RAN WG2 Meeting #109E , "Connection to 5GC—Online", Huawei, Feb. 24-Mar. 6, 2020, 10 pages.
R2-2009122 (Part 3/3), "Final Summary and proposals based on the email discussion [Post111-e][627][Relay] Remaining issues on L2 architecture", MediaTek Inc. (Email Discussion Rapporteur), Nov. 2-13, 2020, 18 pages.
R2-2009122 (Part 2/3), "Phase 2 summary and proposal based on the email discussion [Post111-e][627][Relay] Remaining issues on L2 architecture", MediaTek Inc. (Email Discussion Rapporteur), Nov. 2-13, 2020, 25 pages.
R2-2009230 , "Ericsson, RAN2 impacts introduced by Layer 2 SL relay [online]", 3GPP TSGRAN WG2 #112-e, Oct. 22, 2020, 9 pages.
R2-2107709 , "Paging delivery via L2 Relay in RRC_Connected [online]", Samsung Electronics 3GPP TSG RAN WG2 #115-e, Aug. 6, 2021, 4 pages.

* cited by examiner

User Plane Radio Protocol Stack for Layer 2 Evolved UE-to-network Relay (PC5)

Control Plane Radio Protocol Stack for Layer 2 Evolved UE-to-network Relay (PC5)

METHOD FOR EFFICIENT PAGING FOR USER EQUIPMENT TO NETWORK RELAYS

CROSS REFERENCE TO RELATED APPLICATIONS

This application is a U.S. National Stage Application under 35 U.S.C. 371 of International Patent Application No. PCT/US2022/022258, filed 29 Mar. 2022, which claims the benefit of U.S. provisional patent application No. 63/167,307, filed 29 Mar. 2021, U.S. provisional patent application No. 63/185,634, filed on 7 May 2021, and U.S. provisional patent application No. 63/249,832, filed 29 Sep. 2021, which are incorporated herein by reference in their entirety.

BACKGROUND

A third-generation partnership program (3GPP) Release 16 (Rel 16) addressed a first version of new radio (NR) sidelink (SL) has been developed and it solely focuses on supporting vehicle to everything (V2X) related road safety services. The Rel 16 design aims to provide support for broadcast, groupcast and unicast communications in both out-of-coverage and in-network coverage scenarios.

Concerning coverage extension for SL based communication, a Release 13 solution for a user equipment to network (UE-to-network) relay is limited to Evolved Universal Terrestrial Radio Access (EUTRA) based technology, and thus cannot be applied to a NR-based system, for both next generation radio access network (NG-RAN) and NR-based sidelink communication. Concerning a UE-to-UE coverage extension, current proximity reachability is limited to single-hop sidelink link, either via EUTRA-based or NR-based sidelink technology. However, that approach is not sufficient in the scenario where there is no Uu reference point interface coverage, considering the limited single-hop sidelink coverage. Accordingly, sidelink connectivity should be further extended in NR framework, in order to support the enhanced QoS requirements. The disclosure herein addresses these and other concerns.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref") in the FIGS. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
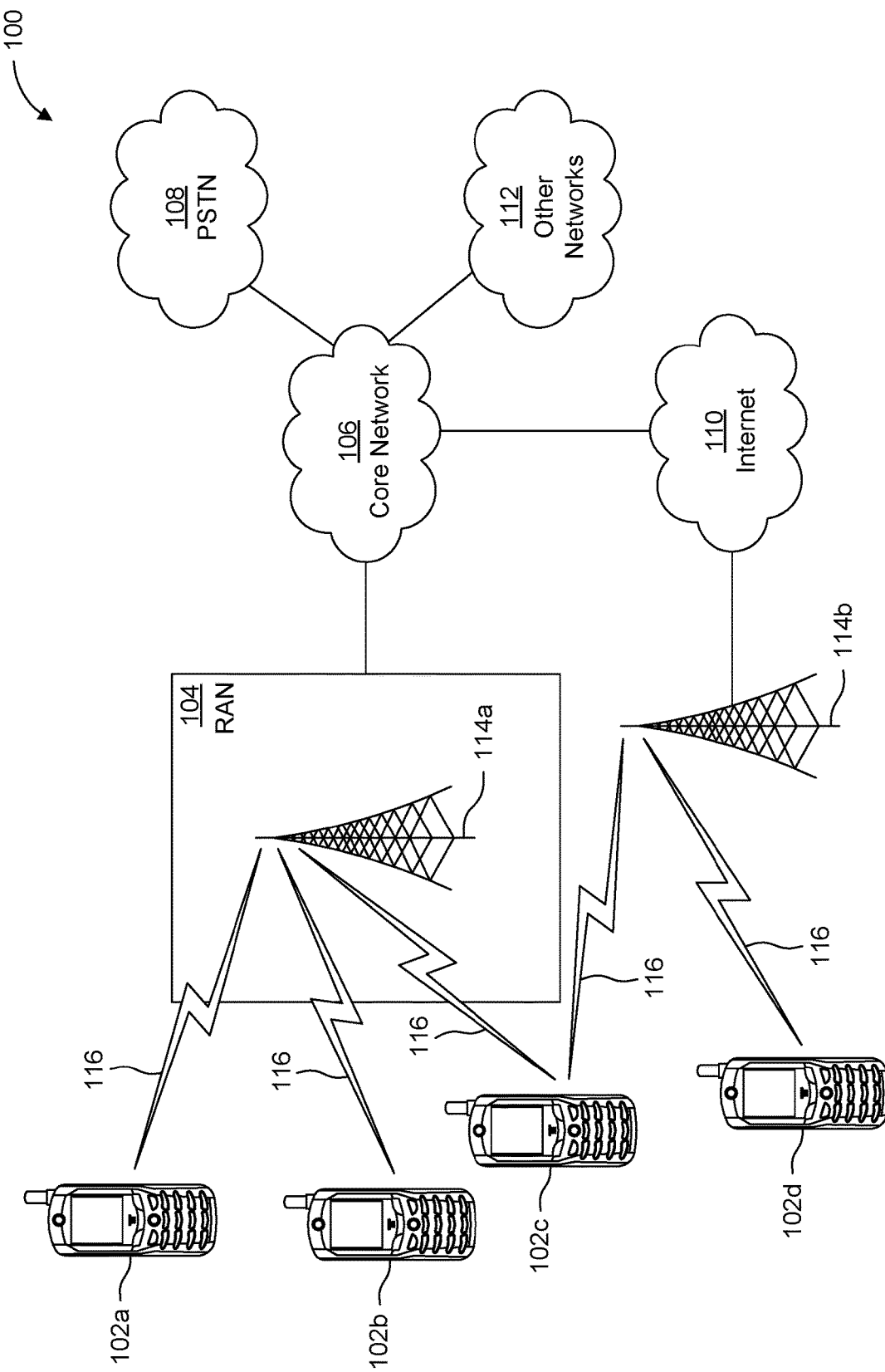
FIG. 1A is a system diagram illustrating an example communications system.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
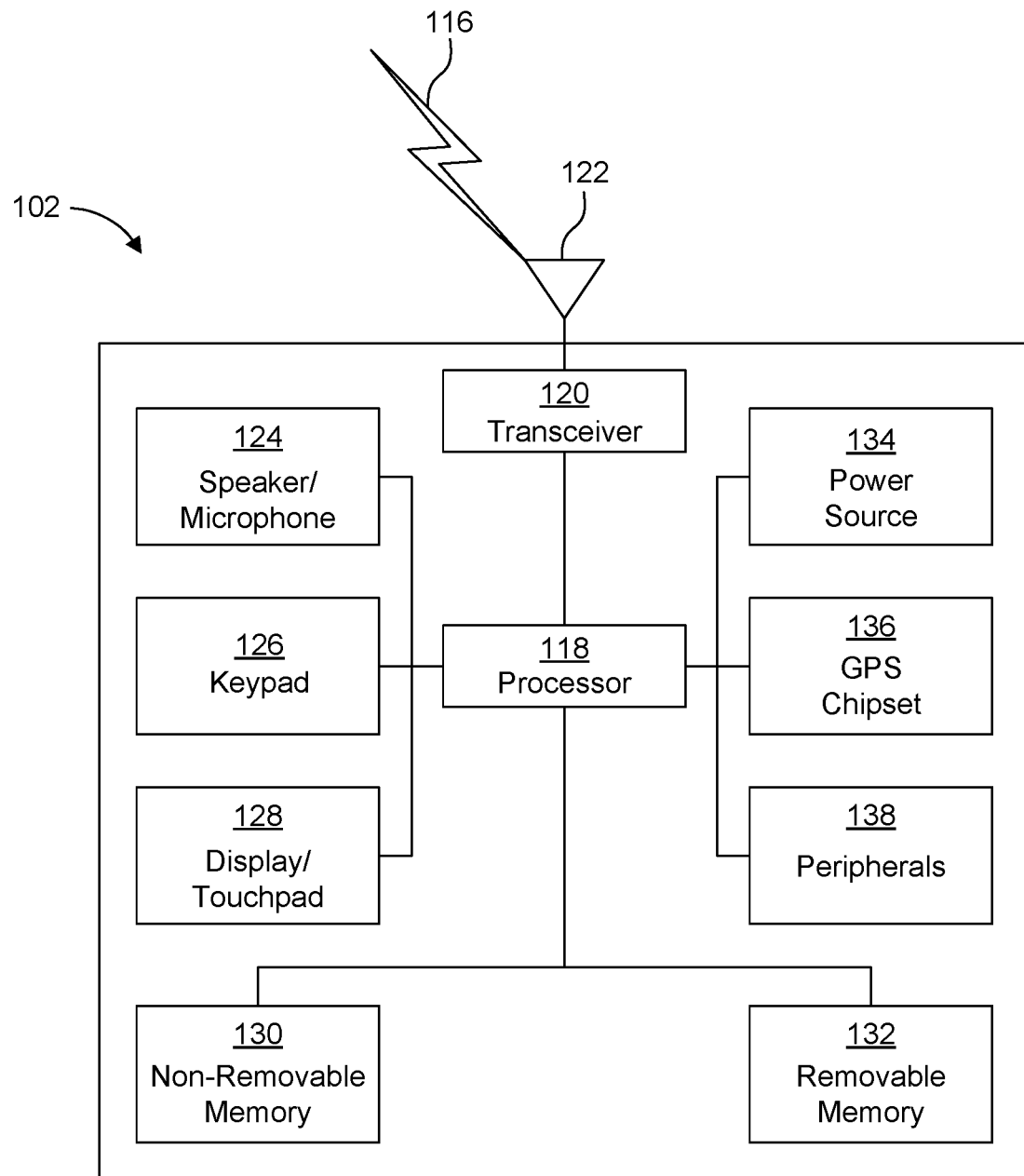
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
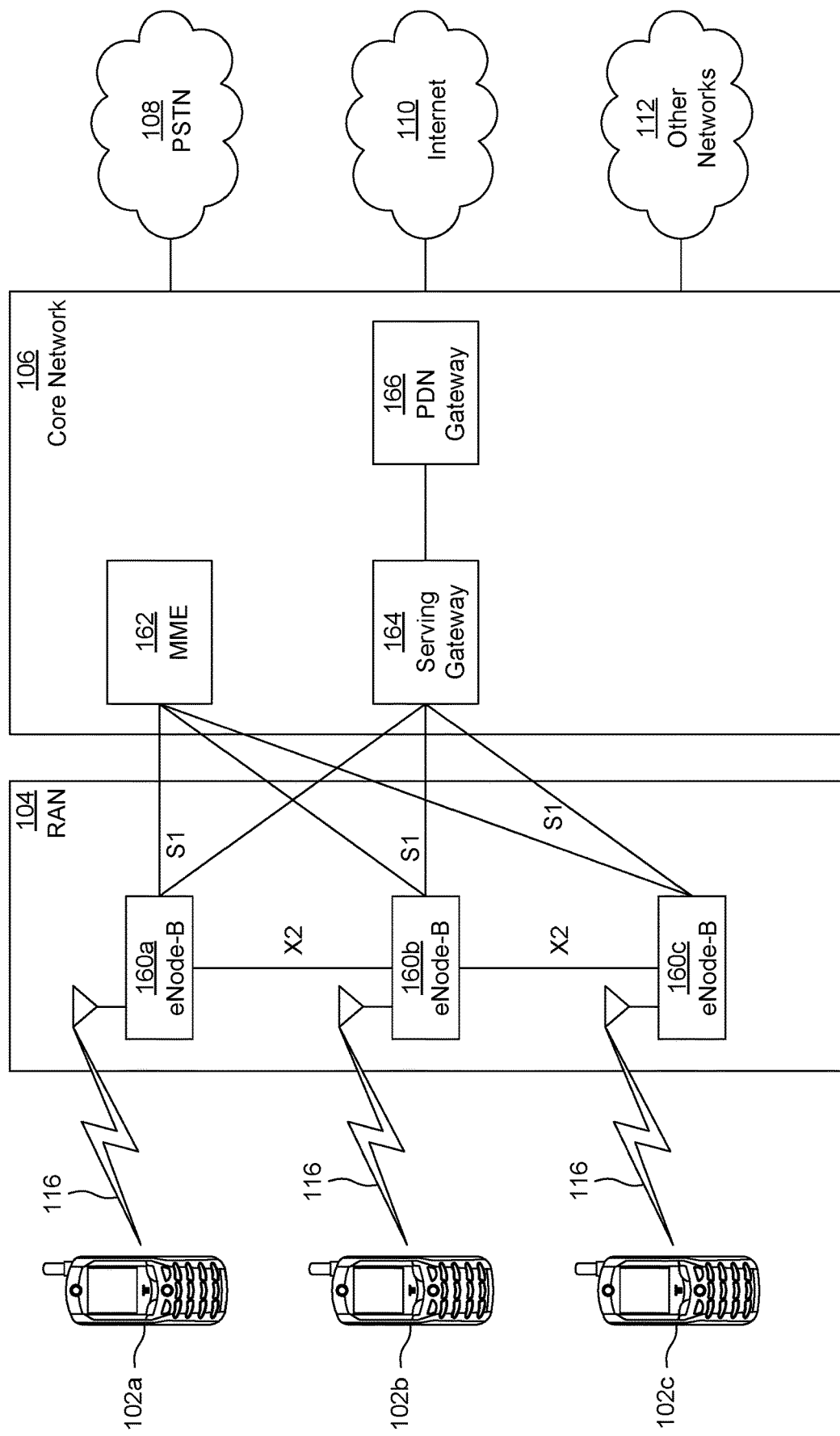
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
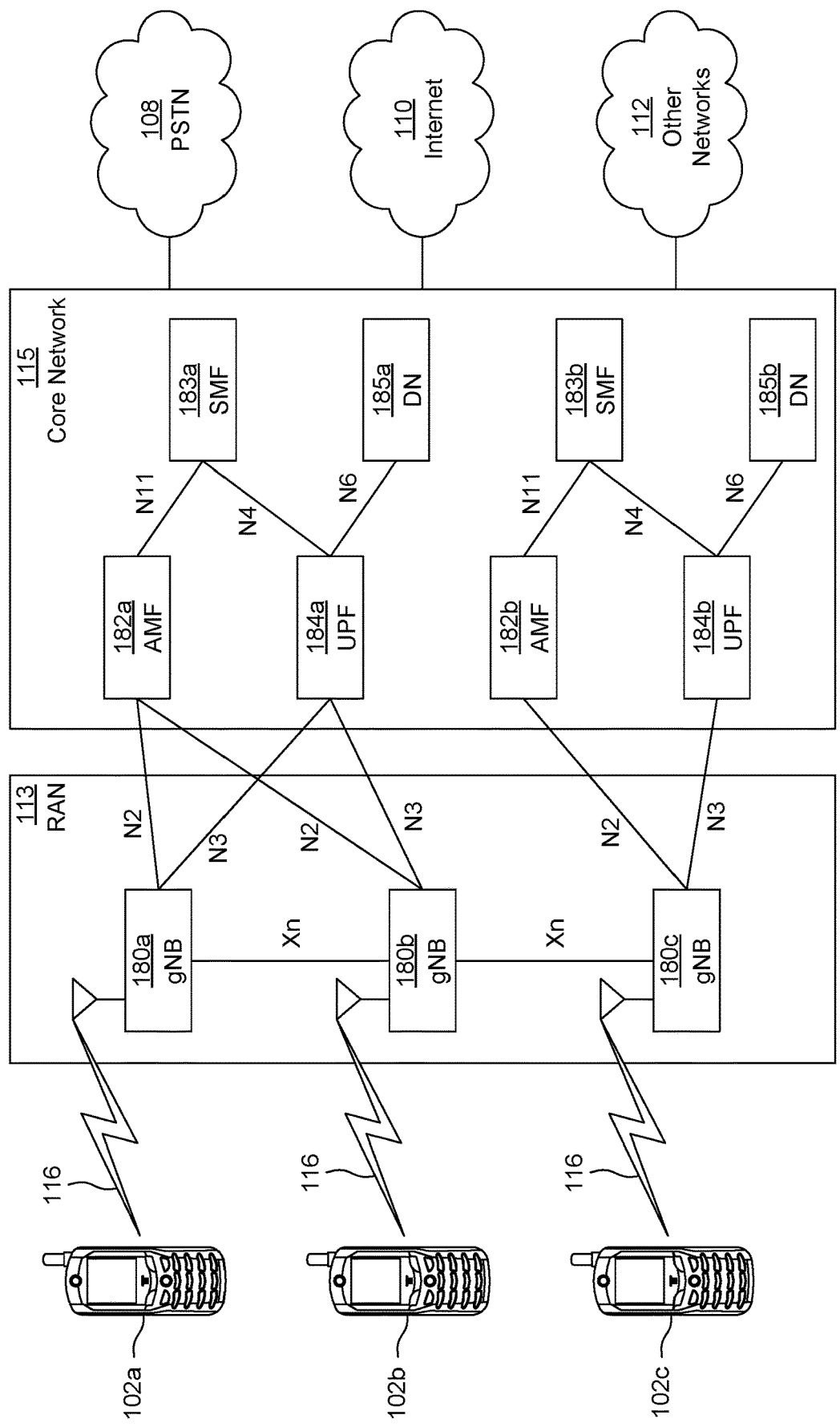
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit/receive unit (WTRU) may be an example of a user equipment (UE). Hence the terms UE and WTRU may be used with equal scope herein.

INTRODUCTION

UE/WTRU to Network (NW) Relays in 3GPP Release 13

Relaying via a proximity service (ProSe) UE to Network relays was introduced in 3GPP Release 13 to extend network coverage to an out of coverage UE by using a PC5 device to device (D2D) communication between an out of coverage UE and a UE-to-Network relay as described in 3GPP TS 36.300—TSGRAN E-UTRA and E-UTRAN Overall Description Stage 2 (V15.4.0) as follows in relevant part:

A ProSe UE-to-Network Relay provides a generic L3 forwarding function that can relay any type of IP traffic between the Remote UE and the network. One-to-one and one-to-many sidelink communications are used between the Remote UE(s) and the ProSe UE-to-Network Relay. For both Remote UE and Relay UE only one single carrier (i.e., Public Safety ProSe Carrier) operation is supported (i.e., Uu and PC5 link interfaces should use the same carrier for Relay/Remote UE). The Remote UE is authorized by upper layers and can be in-coverage of the Public Safety ProSe Carrier or out-of-coverage on any supported carriers including Public Safety ProSe Carrier for UE-to-Network Relay discovery, (re)selection and communication. The ProSe UE-to-Network Relay is always in-coverage of evolved—UMTS RAN (E-UTRAN). The ProSe UE-to-Network Relay and the Remote UE perform sidelink communication and sidelink discovery as described in section 23.10 and 23.11 respectively.

Relay Selection for UE/WTRU to NW Relays

Relay selection/reselection for ProSe UE to NW relays is performed based on combination of an access stratum (AS) layer quality measurements (such as reference signal received power (RSRP)) and upper layer criteria. This is described in more detail in the stage 2 specifications, as described in 3GPP TS 36.300—TSGRAN E-UTRA and E-UTRAN Overall Description Stage 2 (V15.4.0) as follows in relevant part:

The eNB controls whether the UE can act as a ProSe UE-to-Network Relay:

a. If the eNB broadcast any information associated to ProSe UE-to-Network Relay operation, then ProSe UE-to-Network Relay operation is supported in the cell;

b. The eNB may provide:

i. Transmission resources for ProSe UE-to-Network Relay discovery using broadcast signaling for the radio resource control (RRC) RRC_IDLE state and dedicated signaling for RRC_CONNECTED state;

ii. Reception resources for ProSe UE-to-Network Relay discovery using broadcast signaling;

iii. The eNB may broadcast a minimum and/or a maximum Uu link quality (RSRP) threshold(s) that the ProSe UE-to-Network Relay needs to respect before it can initiate a UE-to-Network Relay discovery procedure. In RRC_IDLE, when the eNB broadcasts transmission resource pools, the UE uses the threshold(s) to autonomously start or stop the UE-to-Network Relay discovery procedure. In RRC_CONNECTED, the UE uses the threshold(s) to determine if it can indicate to eNB that it is a Relay UE and wants to start ProSe UE-to-Network Relay discovery;

iv. If the eNB does not broadcast transmission resource pools for ProSe-UE-to-Network Relay discovery, then a UE can initiate a request for ProSe-UE-to-Network Relay discovery resources by dedicated signaling, respecting these broadcasted threshold(s).

c. If the ProSe-UE-to-Network Relay is initiated by broadcast signaling, it can perform ProSe UE-to-Network Relay discovery when in RRC_IDLE. If the ProSe UE-to-Network Relay is initiated by dedicated signaling, it can perform relay discovery as long as it is in RRC_CONNECTED.

A ProSe UE-to-Network Relay performing sidelink (SL) communication for ProSe UE-to-Network Relay operation has to be in RRC_CONNECTED. After receiving a layer-2 link establishment request or temporary mobile group identity (TMGI) monitoring request (upper layer message) from the Remote UE, the ProSe UE-to-Network Relay indicates to the eNB that it is a ProSe UE-to-Network Relay and intends to perform ProSe UE-to-Network Relay sidelink communication. The eNB may provide resources for ProSe UE-to-Network Relay communication.

The remote UE can decide when to start monitoring for ProSe UE-to-Network Relay discovery. The Remote UE can transmit ProSe UE-to-Network Relay discovery solicitation messages while in RRC_IDLE or in RRC_CONNECTED depending on the configuration of resources for ProSe UE-to-Network Relay discovery. The eNB may broadcast a threshold, which is used by the Remote UE to determine if it can transmit ProSe UE-to-Network Relay discovery solicitation messages, to connect or communicate with ProSe UE-to-Network Relay UE. The RRC_CONNECTED Remote UE, uses the broadcasted threshold to determine if it can indicate to eNB that it is a Remote UE and wants to participate in ProSe UE-to-Network Relay discovery and/or communication. The eNB may provide, transmission resources using broadcast or dedicated signaling and reception resources using broadcast signaling for ProSe UE-to-Network Relay Operation. The Remote UE stops using ProSe UE-to-Network Relay discovery and communication resources when RSRP goes above the broadcasted threshold. NOTE: Exact time of traffic switching from Uu to PC5 or vice versa is up to higher layer.

The Remote UE performs radio measurements at PC5 interface and uses them for ProSe UE-to-Network Relay selection and reselection along with higher layer criterion. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays.

The Remote UE triggers ProSe UE-to-Network Relay reselection when:
  a. PC5 signal strength of current ProSe UE-to-Network Relay is below configured signal strength threshold;
  b. It receives a layer-2 link release message (upper layer message) from ProSe UE-to-Network Relay.

UE/WTRU to Network Relays for Wearables

Figure 2:
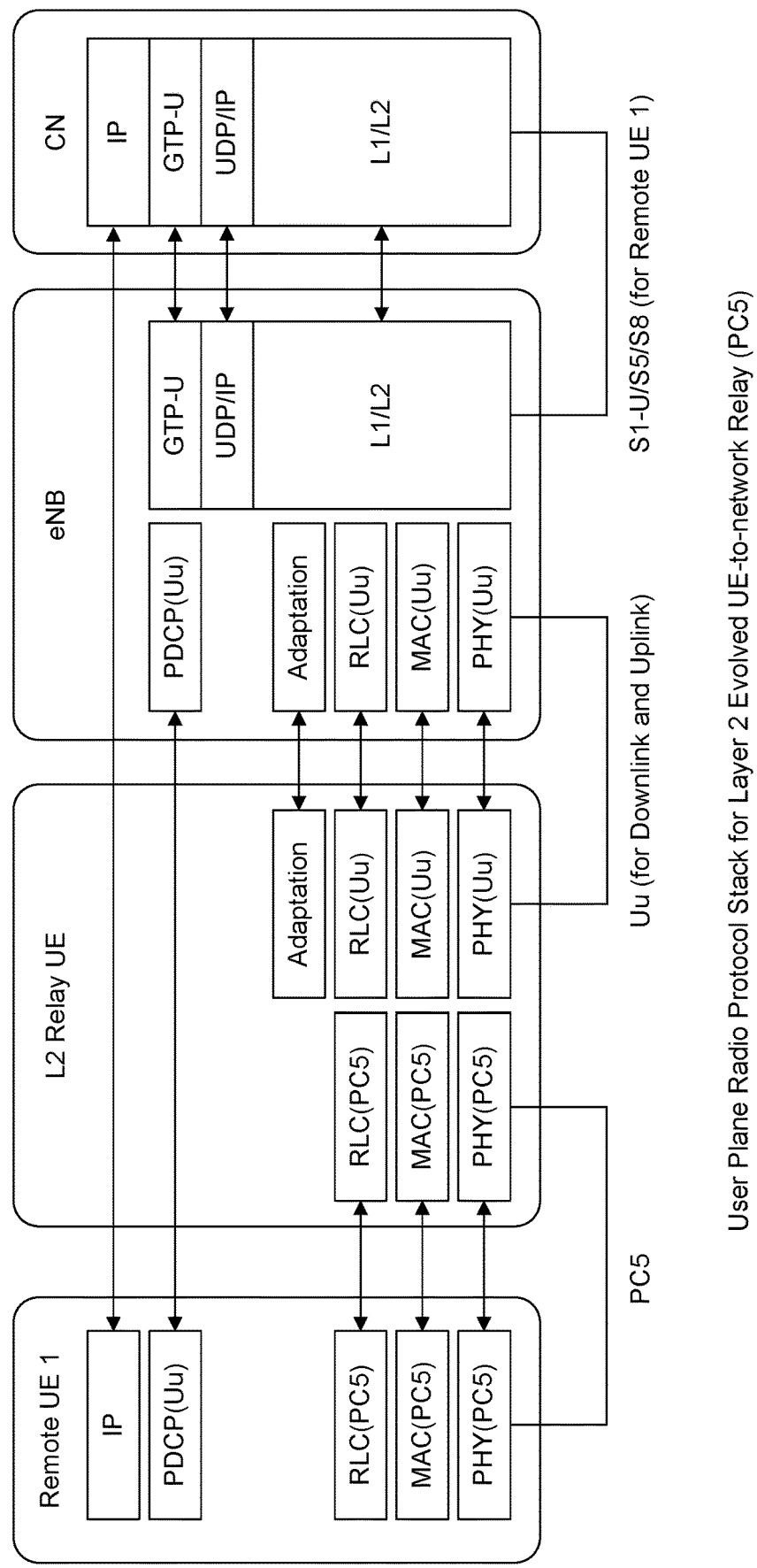
FIG. 2 depicts a diagram of a user plane protocol stack for a UE-to-Network relay.
Figure 3:
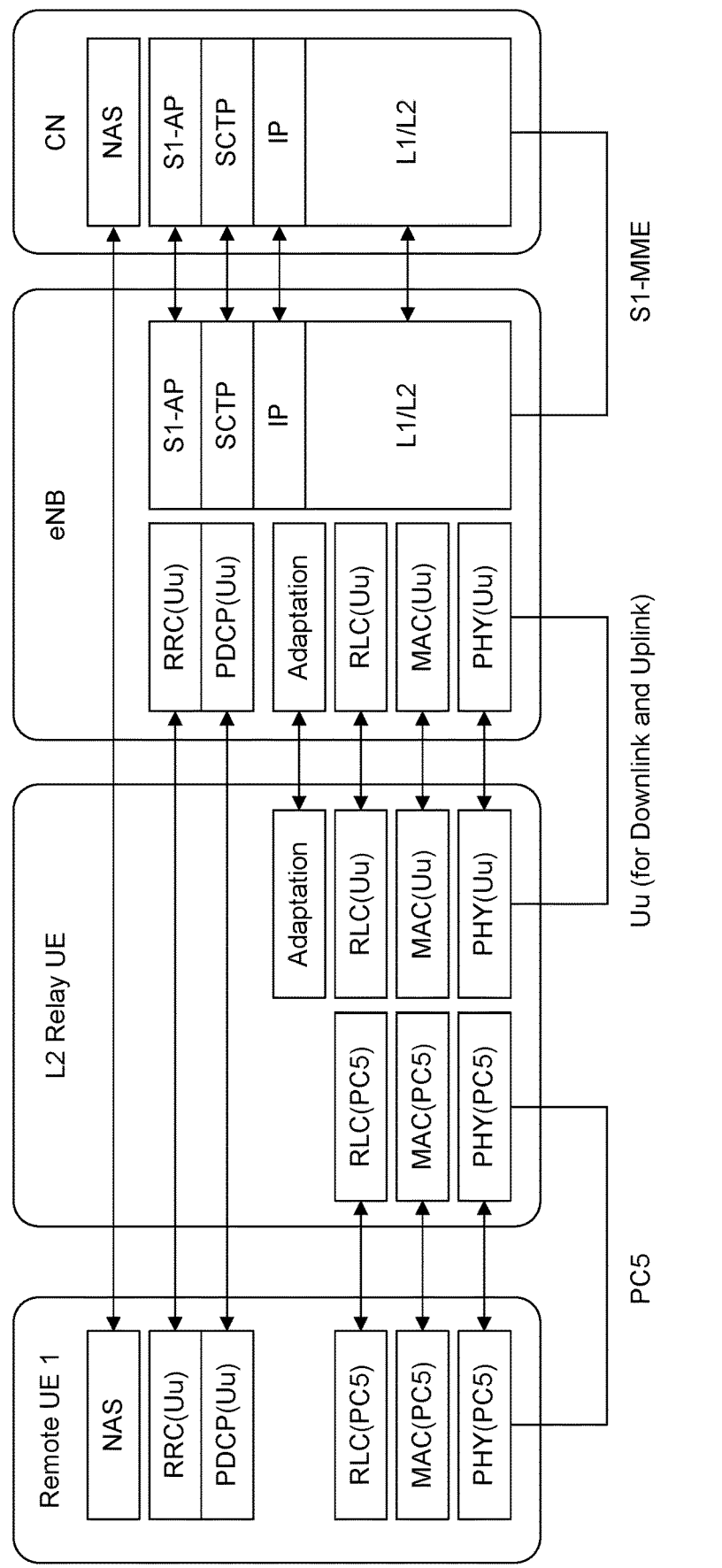
FIG. 3 depicts a diagram of a control plane protocol stack for a UE-to-Network relay.

In 3GPP Release 14, a study for UE to NW relays for commercial use cases tailored to wearables and IoT devices was performed in RAN. While such study did not result in any specification, a technical report (TR) provided some preferred solutions for such relays. Contrary to ProSe UE to NW relays which uses a L3 (IP layer) relaying approach, the UE to NW relays for wearables was expected to be a L2 relay based on the protocol stacks shown in FIG. 2 and FIG. 3 from 3GPP TR 36.746—Study on Further enhancements to LTE D2D, UE to network relays for IoT and Wearables (V15.1.1).

Connection Establishment for Unicast Links in NR V2X

Relay solutions in previous releases of the LTE specification were based on a one to one communication link established at upper layers (ProSe layer) between two UEs (the remote UE and UE to NW relay). Such connection was transparent to the access stratum (AS) layer and connection management signaling and procedures performed at the upper layers are carried by AS layer data channels. The AS layer is therefore unaware of such a one to one connection.

In NR V2X (Rel 16), the AS layer supports the notion of a unicast link between two UEs. Such unicast link is initiated by upper layers (as in the ProSe one-to-one connection). However, the AS layer is informed of the presence of such unicast link, and any data that is transmitted is in unicast fashion between the peer UEs. With such knowledge, the AS layer can support hybrid automatic repeat request (HARQ) feedback, channel quality indicator (CQI) feedback, and power control schemes which are specific to unicast.

A unicast link at the AS layer is supported via a PC5-radio resource control (RRC) connection. In 3GPP TS 38.300—NR and NG-Radio Access Network (RAN) Overall Description Stage 2 (V16.1.1), the PC5-RRC connection is defined as follows in relevant part:

The PC5-RRC connection is a logical connection between a pair of a Source Layer-2 ID and a Destination Layer-2 ID in the AS. One PC5-RRC connection is corresponding to one PC5 unicast link. The PC5-RRC signaling, as specified in sub-clause 5.X.9, can be initiated after its corresponding PC5 unicast link establishment. The PC5-RRC connection and the corresponding sidelink signaling radio bearers (SRB)s and sidelink data radio bearers (DRB)s are released when the PC5 unicast link is released as indicated by upper layers.

For each PC5-RRC connection of unicast, one sidelink SRB is used to transmit the PC5-S (signaling) messages before the PC5-S security has been established. One sidelink SRB is used to transmit the PC5-S messages to establish the PC5-S security. One sidelink SRB is used to transmit the PC5-S messages after the PC5-S security has been established, which is protected. One sidelink SRB is used to transmit the PC5-RRC signaling, which is protected and only sent after the PC5-S security has been established.

PC5-RRC signaling includes a sidelink configuration message (RRCReconfigurationSidelink) where one UE configures the receive (RX)-related parameters of each sidelink radio bearer (SLRB) in the peer UE. Such reconfiguration message can configure the parameters of each protocol in the L2 stack (service data adaptation protocol (SDAP), packet data convergence protocol (PDCP), etc). The receiving UE can confirm or reject such configuration, depending on whether it can support the configuration suggested by the peer UE.

Paging in NR

In NR Uu, the UE/WTRU may use Discontinuous Reception (DRX) in RRC_IDLE and RRC_INACTIVE state in order to reduce power consumption. The UE monitors one paging occasion (PO) per DRX cycle. A PO is a set of physical downlink control channel (PDCCH) monitoring occasions and may include multiple time slots (e.g. subframe or OFDM symbol) where paging downlink control information (DCI) may be sent. One Paging Frame (PF) is one Radio Frame and may contain one or multiple PO(s) or starting point of a PO per 3GPP TS 38.300—NR and NG-RAN Overall Description Stage 2 (V16.1.1).

In multi-beam operations, the UE assumes that the same paging message and the same Short Message are repeated in all transmitted beams and thus the selection of the beam(s) for the reception of the paging message and Short Message is up to UE implementation. The paging message is same for both radio access network (RAN) initiated paging and core network (CN) initiated paging and includes of a set of paging records. A paging message may contain one or more paging records (i.e. one or more UE IDs) corresponding to the UEs mapped to the same paging occasion and receiving paging from the network in that paging occasion. The UE ID in the paging record could be a 5G Serving Temporary Mobile Subscriber Identifier (5G-S-TMSI) (48 bits) if CN paging, or an Inactive Radio-Network Temporary Identifier (I-RNTI) (40 bits) if RAN paging is used per 3GPP TS 38.300—NR and NG-RAN Overall Description Stage 2 (V16.1.1).

A UE in IDLE/INACTIVE determines its paging frame (PF) and paging occasion (PO) based on any one of:
  a. Paging frame configuration in system information block (SIB).
  b. UE specific or default DRX cycle.
    i. Specifically, a UE in RRC_IDLE determines its DRX cycle from the minimum of:
      1) the default DRX cycle broadcast in SIB, and
      2) the UE specific DRX cycle provided in dedicated non-access stratum (NAS) signaling.
    ii. A UE in RRC INACTIVE determines its DRX cycle from the minimum of:
      1) the default DRX cycle broadcast in SIB,
      2) the UE specific DRX cycle provided in dedicated Non-Access Stratum (NAS) signaling, and
      3) the UE specific DRX cycle provided in dedicated radio resource control (RRC) signaling.
  c. UE ID (i.e. the 5G-S-TMSI).

The PF and PO are defined according to the following formula of 3GPP TS 38.304—NR and NG-RAN IDLE mode specification (V16.3.0).

Single frequency network (SFN) for the PF is determined by:

(SFN+PF_offset)mod $T$=($T$ div $N$)*(UE_ID mod $N$)

Index (i_s), indicating the index of the PO is determined by:

i_s=floor(UE_ID/$N$)mod Ns

The following parameters are used for the calculation of PF and i_s above:
- T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).
- N: number of total paging frames in T.
- Ns: number of paging occasions for a PF.
- PF_offset: offset used for PF determination.
- UE_ID: 5G-S-TMSI mod 1024.

The PDCCH monitoring occasions for paging are determined according to pagingSearchSpace as specified in 3GPP TS 38.213 and firstPDCCH-MonitoringOccasionOfPO and nrofPDCCH-MonitoringOccasionPerSSB-InPO if configured as specified in 3GPP TS 38.331. When SearchSpaceId=0 is configured for pagingSearchSpace, the PDCCH monitoring occasions for paging are same as for remaining minimum system information (RMSI) as defined in clause 13 in 3GPP TS 38.213.

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. A PO is a set of 'S*X' consecutive PDCCH monitoring occasions where 'S' is the number of actual transmitted synchronization signal blocks (SSBs) determined according to ssb-PositionsInBurst in SIB1 and X is the nrofPDCCH-MonitoringOccasionPerS SB-InPO if configured or is equal to 1 otherwise. The [x*S+K]th PDCCH monitoring occasion for paging in the PO corresponds to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it is equal to i_s*S*X. If X>1, when the UE detects a PDCCH transmission addressed to paging radio-network temporary identifier (P-RNTI) within its PO, the UE is not required to monitor the subsequent PDCCH monitoring occasions for this PO of 3GPP TS 38.304—NR and NG-RAN IDLE mode specification (V16.3.0).

The following parameters are used for the calculation of PF and i_s above:
- T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).
- N: number of total paging frames in T.
- Ns: number of paging occasions for a PF.
- PF_offset: offset used for PF determination.
- UE_ID: 5G-S-TMSI mod 1024.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset as defined in TS 38.331. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration of 3GPP TS 38.304—NR and NG-RAN IDLE mode specification (V16.3.0).

Paging for UE/WTRU to NW Relays

In the system information (SI) for LTE wearables, three options were studied for paging reception by the remote UE per 3GPP TR 36.746—Study on Further enhancements to LTE D2D, UE to network relays for IoT and Wearables (V15.1.1).
  a. Option 1—The remote UE monitors its own POs for reception of NW paging.
  b. Option 2—The relay UE monitors the POs associated with each of its connected remote UEs and forwards the paging message (if received) to the remote UE.
  c. Option 3—The relay UE receives any paging messages associated with connected remote UEs in the relay UE's PO.

In the study, option 2 was recommended. For NR UE to NW relays in Rel 17, option 2 is assumed as well.

SI Notification in Paging Message

A UE can receive notification of modified SI and/or PWS indication (hereby referred to as SI notification) in paging. Such SI notification can be sent in what is referred to as short message on the paging channel. The short message may separately indicate the presence of a PWS SIB that is being broadcast by the network (for emergency situations). In addition, the short message may separately indicate that one or more of the SIBs for the cell have changed. A UE that is notified of a modified SI or PWS indication can acquire the applicable SI following normal SI acquisition procedures.

Problem Statement

In sidelink (SL) UE/WTRU to NW relays for NR, a remote UE/WTRU is assumed to receive paging from the NW using option 2 defined in 3GPP TR 36.746—Study on Further enhancements to LTE D2D, UE to network relays for IoT and Wearables (V15.1.1). Specifically, the relay UE monitors the PO of the connected remote UEs and relays any received paging messages to the remote UE. In essence, this creates a number of issues as described below.

Power Consumption at the Relay UE/WTRU

Figure 4:
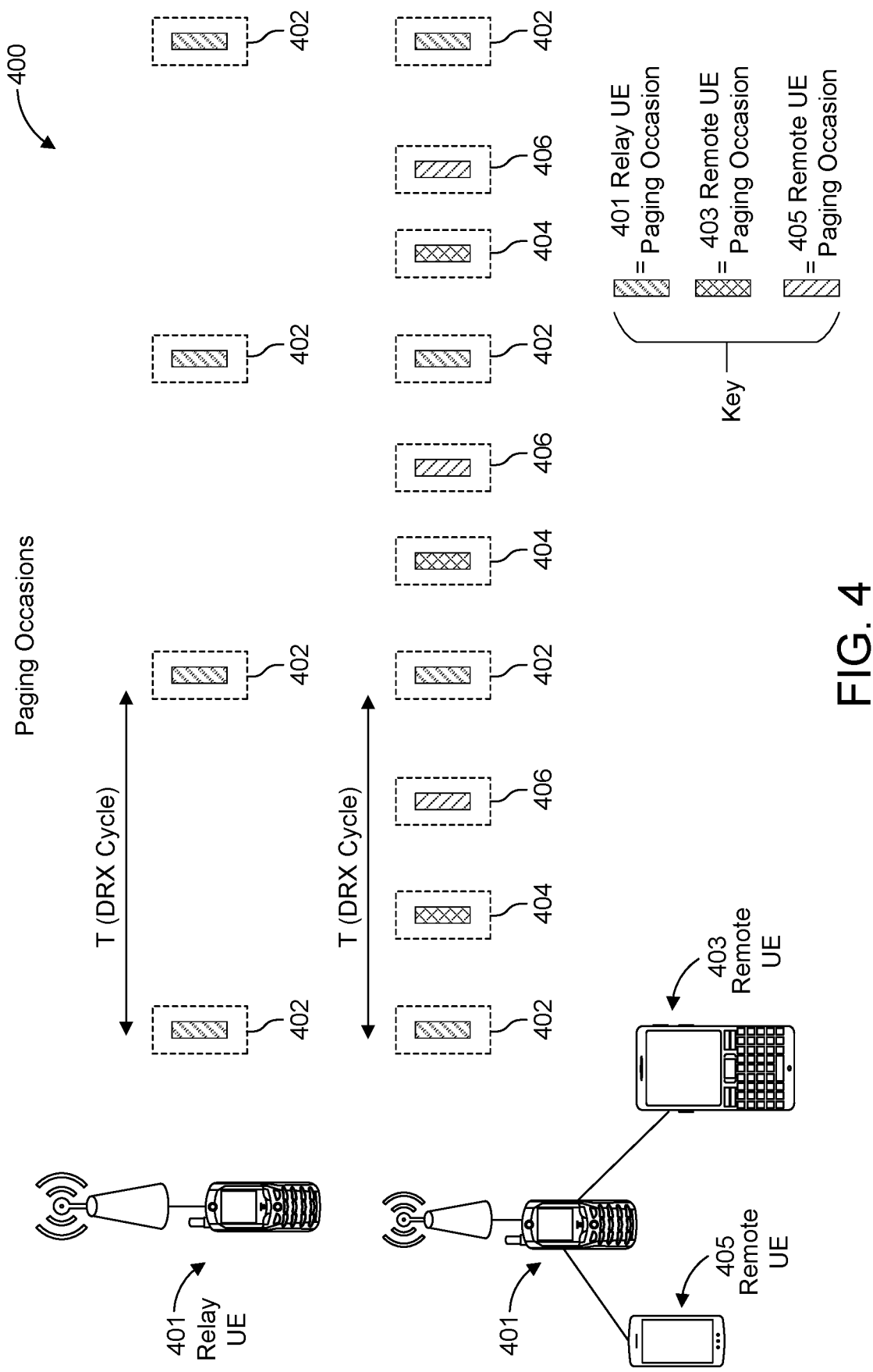
FIG. 4 depicts an example timing diagram of paging occasions.

The remote UE PO is defined based on the UE's 5G-S-TMSI. As a result, a relay UE having multiple PC5-RRC connected remote UEs may need to be monitoring a number of different POs configured by the network, in addition to its own PO. This is shown in FIG. 4 where the relay UE 401 needs to monitor its own paging occasions shown as 402. The relay UE 401 also may monitor the paging occasions of its remote UEs 403 and 405 which happen to occur in different time slots shown as 404 and 406 respectively. As the number of remote UE's increases, the power savings of a relay UE that is in IDLE DRX (i.e. in RRC_IDLE or RRC_INACTIVE) is reduced. This reduction becomes even more of an issue as the number of remote UEs served by a relay increases, as well as when we start to consider more complex architectures like multihop relay.

While other options would be to change the definition of the PO of the remote UE so that remote UEs under a single relay UE would have same/similar POs, or to simply transmit the remote UEs paging in the PO of the relay, this would eliminate the fundamental advantage of option 2 in that the remote UE has the flexibility of receiving the paging message either via Uu or via relay without the need to inform the network of a change.

Another aspect of power consumption for the relay UE is associated with the need to have to forward a single paging message (which may contain multiple paging records whereby the paging records could be associated with remote UEs connected to the same relay) using multiple unicast transmissions to each unicast link. The problem may become worse if we support multiple unicast links between a single remote UE and relay UE for the Uu relaying connection.

Thus, one problem may be posed as how to realize option 2 at the relay UE/WTRU in a power efficient manner (i.e. minimizing additional power consumption at the relay UE/WTRU associated with monitoring the POs associated with all remote UEs/WTRUs).

Power consumption at the remote UE/WTRU

A UE in RRC_IDLE/RRC_INACTIVE served by Uu will be configured with DRX defined based on its paging DRX cycle and PO timing. This allows the UE to save power while in these states. If a UE in RRC_IDLE/RRC_INACTIVE receives paging via a relay UE, it needs to monitor sidelink instead of Uu. To achieve similar power savings, some limited monitoring on sidelink should be defined for the remote UE to receive relayed paging. While this limited monitoring time should have some time relation to the UE's Uu PO (assuming option 2 is used), an exact one-to-one relationship cannot be derived due to the uncertainty associated with relaying over sidelink, both in terms of the sidelink characteristics (e.g. the need to perform resource selection using mode 2 on a shared resource pool) as well as factors associated with the relay itself (e.g. relaying latency, beam configuration).

Thus, another problem may be posed as how to avoid that a remote UE/WTRU in RRC_IDLE/RRC_INACTIVE needs to continuously monitor sidelink to receive Uu paging when connected to a UE/WTRU to NW relay, and to define a limited monitoring period that accounts for the uncertainty associated with Uu. There is currently no concept of a paging occasion on sidelink.

Lack of Knowledge of the Remote UE/WTRU Relation to the Paging Record Due to Security of the Remote UE/WTRU's Identity L2 relay achieves security of data transmissions inherently in its protocol stack. Specifically, since packet data convergence protocol (PDCP) is end to end, ciphered data transmissions by the remote UE/NW cannot be decoded by the relay when transmitted to the NW/remote UE.

On the other hand, the paging occasion for a remote UE is calculated using the remote UE's 5G-S-TMSI. To avoid that this information be known by the relay UE (which could be an attacker), it would be preferable that the relay UE is aware only of the paging occasions itself, and not the remote UE ID. However, since multiple UEs can be mapped to the same PO, the relay UE cannot be aware of whether/which remote UE a specific paging message received at a PO is associated with. This can lead to inefficiencies associated with transmitting the relayed paging message at the relay UE, such as repeating the paging message multiple times, or transmitting the paging message to a remote UE that is not being paged.

Thus, another problem may be posed as how to avoid redundant transmissions of a relayed paging message by a relay UE/WTRU due to hiding the UE/WTRU ID of the remote UE/WTRU from the relay UE/WTRU.

Methods for Efficient Paging for SL UE/WTRU to NW Relays.

Methods for Paging Reception by a Relay UE/WTRU.

Relay UE/WTRU Determines Remote UE/WTRU POs to Monitor Based on Information in an Active PO Indication.

In one solution, a relay UE, possibly in RRC_IDLE/RRC_INACTIVE, may receive an active PO indication from the network. Such indication may inform the remote UE that one or more paging message will be sent in one or more upcoming paging occasions associated with another UE, and may further indicate which PO, group of POs, remote UE, group of remote UEs, paging frame, group of paging frames, will be paged in the near future.

A relay UE may determine whether to monitor an upcoming paging occasion, or a paging occasion in a future time period based on the information in such indication, along with possibly the knowledge of whether one or more specific UEs associated/referenced by the paging occasion are currently connected to the relay UE. Specifically, the relay UE may receive an active PO indication from the network which is applicable to a predefined, (pre)configured, or indicated period of time in the future. If the active PO indication indicates that a paging message will be sent for a particular UE/PO/PF/etc., and the relay UE is currently serving a specific UE (e.g. has a PC5-RRC unicast link with the UE) that is associated with the UE, the relay UE may monitor/wakeup to monitor the paging channel at the time instance associated with the particular UE/PO/PF/etc. Otherwise, the relay UE may not be required to wakeup/monitor the paging channel at that time.

Timing of the Active Paging Indication

A relay UE may be configured to monitor PDCCH, possibly while in RRC_IDLE/RRC_INACTIVE, at a defined/configured time/times where the relay UE may expect an active paging indication. A relay UE may monitor PDCCH at such times, possibly in addition to its PDCCH monitoring occasions associated with paging. A relay UE may receive the active paging indication at any or a combination of the following times:

a. During the relay UE's IDLE/INACTIVE paging occasions or paging monitoring occasions.
   i. Specifically, the relay UE may receive the active paging indication at the same PDCCH monitoring occasions associated with its own paging occasion.
b. At a time instant related to the relay UE's paging occasion or paging monitoring occasions.
   i. For example, a UE may be configured with a time offset in terms of slots, symbols, radio frames, etc. from the first/last monitoring occasion associated with its paging occasion.
   ii. For example, a UE may be configured to receive the active paging indication at a predefined slot or set of slots within its own paging frame.
   iii. For example, a UE may be configured to receive the active paging indication at a predefined slot or set of slots within the frame which contains the first/last PDCCH monitoring occasion associated with the UE's paging occasion.
c. At another PO configured by the network and defined for reception of the active paging indication.
   i. For example, a UE may be configured to receive an active paging indication at another PO configured by the network using the current paging configuration.

The UE may further be configured with specific rules on how to determine the PO associated with reception of the active paging indication. Such rules may be defined in relation to the relay UE's current PO or may be independent of the relay UE's current PO. Such rules may involve determination of a PO for reception of the active paging indication but using a different parameter (e.g. UE ID, T, etc.) in the calculation of the PF/PO for the UE.
  1. For example, a UE may be configured to receive the active paging indication in the PO which follows/precedes its own PO.
  2. For example, a UE may be configured to receive the active paging indication in a PO which is computed using a predefined or configured UE ID (in the place of the 5G-S-TMSI).
  3. For example, a UE may be configured to receive the active paging indication at a PO which is defined by using a value of T (i.e. DRX cycle) which is different than the UE's determined DRX cycle (e.g. using the minimum defined DRX cycle in the specifications).
  d. At a predefined or configured frame/slot/symbol.

The timing of the expected PO may further depend on the DRX configuration itself. Specifically (and to handle cases of large configured DRX) the UE may be configured with a first expected time for receiving the message when the DRX cycle has a first set of values or value range, and may be configured with a second/different expected time for receiving the message when the DRX cycle has a second set of values or value range.

A relay UE may determine a frequency (how often) or a density of Uu resources/timings for receiving the message based on any or a combination of:
  a. The DRX cycle of the relay UE.
    i. For example, the message may be received/expected more frequently for longer DRX cycle.
    ii. The message may be expected on a different set of resources depending on whether the relay UE is configured with the minimum DRX cycle or not.
  b. The number of connected UEs.
    i. For example, the message may be received/expected more frequently for a relay UE with a larger number of connected remote UEs.
  c. The UE_ID and/or pattern/timing of POs associated with the connected remote UEs.
    i. For example, the frequency or timing associated with reception of the message may depend on the number/pattern of paging occasions associated with connected remote UEs. For example, the relay UE may receive the message more frequently in slots which are located closer (in time) to the paging occasions of the connected remote UEs. For example, the relay UE may receive the message once for each N paging occasions associated with a connected remote UE. For example, the message may be located at most/at least a number of slots before/after any PO of a connected remote UE.
  d. QoS/bearers/services established at the remote UEs.
    i. For example, the relay UE may receive/expect the message more frequently of one/any of the remote UEs have a bearer/QoS flow/priority associated with higher QoS transitions.
  e. RRC state associated with one or more of the remote UEs.
    i. For example, the relay UE may receive/expect the message more frequently if at least one of the remote UEs is in RRC_INACTIVE state.

Time Validity of the Active Paging Indication

The active paging indication may be associated with a time validity. Specifically, the relay UE may determine a time period over which the information in the active paging indication is valid, possibly in terms of a number of frames and/or slots and/or symbols, or in terms of NW configured POs, or in terms of NW configured PF/POs, or defined/indicated in the active paging indication message itself. Specifically, the relay UE may determine whether to monitor PDCCH for paging at a specific time based on the information in a received active paging indication message as long as the specific time in question falls within the time validity of active paging indication. The UE may determine the time validity of the active paging indication message using any or a combination of:
  a. Based on information in the message itself.
    i. For example, the active paging indication message may indicate the number of frames, subframes, DRX cycles, POs, etc. for which it is indicating active paging
  b. Using a predefined period.
    i. For example, the active paging indication may always provide information for a fixed set of DRX cycle, POs, or the like following the time in which the active paging indication is received, or for a defined time period starting from some defined time instance after the active paging indication is received.
    ii. For example, the active paging indication may provide the activity (whether paging is provided or not) for the set of POs configured by the network in the DRX cycle after the reception of the indication, where the DRX cycle may be a specific DRX cycle (e.g. the minimum/maximum configurable DRX cycle, the default DRX cycle) or a DRX cycle indicated in the message itself
  c. Until the next received paging indication message.
    i. For example, the UE may determine its paging reception activity for each of the POs following reception of a paging indication message, and maintain the determined activity until reception of another paging indication message.

Specific to the time validity, in one example solution, the UE may expect an active paging indication every DRX cycle. In one example embodiment, the UE may derive the monitoring behavior for NW configured POs in the DRX cycle after reception of the active paging indication, using the information in the active paging indication message. In such embodiment, the UE may be configured with a default behavior to be applied in a DRX cycle when it does not receive an active paging indication in the expected time associated with the DRX cycle. For example, the relay UE may assume all POs in the DRX cycle after a missed or not received active paging indication message are considered active. For example, the relay UE may consider every other/none of the POs in the DRX cycle after a missed or not received active paging indication message to be active. For example, a relay UE may consider the POs in the DRX cycle which are active are the same as the active POs in the previous DRX cycle.

In another example embodiment, the UE may expect/receive an active paging indication message only when one or more of the upcoming POs are indicated as active. In such embodiment, the UE may consider the next indicated PO only to be active. Alternatively, the UE may consider the next N instances of an indicated PO to be active, where N can be predefined or further configured by the network.

In each of the above embodiments, a UE may further determine whether monitor a PO or not based on the activity determined as part of the active paging indication message, and whether a UE associated with a PO is currently connected to the relay UE, as defined herein. Specifically, the UE monitors a PO only when the message indicates activity for that PO, and the UE has a PC5-RRC connection with a relay UE that is associated with that PO.

Contents of the Active Paging Indication and Association to the Remote UE/WTRU

The relay UE may receive any of the following information in the active paging indication message:
  a. A validity time for the message, as described herein.
  b. A connected mode gap pattern, as described further herein, if the relay UE is in RRC_CONNECTED.
  c. A format for the message.
    i. For example, if the message contains a bitmap, the message may further define the granularity of the bitmap (e.g. whether each bit is associated with a single PO, or a group of POs, and information needed by the relay UE to determine the grouping and/or mapping to each group).
    ii. For example, if the message contains a bitmap, the message may further define the grouping of UE IDs associated with each bit (e.g. the number of UEs in each group associated with each bit).
  d. One or more UE ID, where such may be a 5G-S-TMSI, I-RNTI, L2 source and/or destination ID. Such ID(s) may be associated with the UEs which will receive paging in the next PO(s) or in a future PO(s).
    i. For example, the relay UE may receive the UE IDs of the connected remote UE's which the NW is expecting to page in the next DRX cycle following the transmission (by the network) of the active paging indication message. Specifically, a relay UE may determine that a specific remote UE (with the UE ID provided in the message) will be paged over a predefined/configured period of time if the UE ID is included in the message.
    ii. Such ID may further be a truncated version of any of the above IDs. Specifically, if a relay UE receives the message with a particular truncated ID, the relay UE may determine that the network may page one or any of the remote UEs with the complete UE ID whose subset of bits matches the received truncated UE ID.
  e. An index identifying a remote UE.
    i. For example, the message may contain an index whereby such index may identify a remote UE in a list of UEs. Such list of UEs may be the list of remote UEs which are currently served by the relay UE at the current time, or at some previous time. Such list of UEs may be derived from a list of remote UEs provided and/or updated by the relay UE to the network as described further herein. Specifically, if the message contains the index of a particular remote UE, the relay UE may determine that the index UE may be paged by the network at some future time period.
  f. An index identifying one or more NW configured paging occasions or paging frames, or group thereof.
    i. For example, it may contain an index referencing a specific PO in the set of NW configured POs based on a predefined or configured numbering.
    ii. For example, it may contain an index referencing a group of POs in the set of NW configured POs, where the grouping and the indexing of the group may be further predefined or configured.
    iii. Specifically, the relay UE may maintain an association between a UE (e.g. one of its remote UEs) and the Uu PO configured for that UE. The relay UE may determine that it should monitor a PO (i.e. a remote UE may be paged in an upcoming paging occasion) when the message contains the index of PO or PO group to which one of its remote UEs is associated to based on the above said association.
  g. A bitmap, where each bit in the bitmap is associated with a remote UE, group of remote UEs, PO or PF or group of POs or PF, or similar.
    i. For example, the message may contain a bitmap, where each bit in the bitmap is associated with a UE, group of UEs, PO or group of POs. Specifically, a relay UE may determine that the network may page one or more remote UEs in a group of connected remote UEs if the corresponding bit in the bitmap is set.
    ii. For example, each bit in the bitmap may be associated with each possible value of remote UE ID (mod N). If a bit is set, the relay UE may consider that at least one remote UE whose POs map to any of the POs defined by that value of UE ID (mod N) may be paged.

Mechanisms for Receiving the Active Paging Indication Message

A relay UE may receive the active paging indication message using any of the following:
  a. A dedicated DCI on PDCCH.
    i. For example, the information associated in the active paging indication message may be encoded on PDCCH using a DCI. Specifically, the relay UE may receive the information of the active paging indication message encoded as part of the DCI.
  b. Using a MAC Control Element (MAC CE).
    i. For example, the relay UE may identify the paging indication message based on the logical channel (LCH) ID or MAC header information where such may indicate a MAC CE, and the information may be embedded in the contents of the MAC CE.
  c. Using a paging message.
    i. For example, the relay UE may receive the active paging indication message in a paging message. Specifically, the relay UE may receive the active paging indication message in an RRC message sent to the relay UE on the paging channel (PCH) (i.e. the UE receives the message after decoding the PDCCH using the P-RNTI). The relay UE may receive the message in a standalone RRC message received on the PCH. In this case, the message may contain an identifier indicating the RRC message contains the active paging indication message. Alternatively, the message (or information associated with the message) may be included in a normal paging message containing other records. In the case the message may be included at the beginning/end of the paging message, or may be included as a string (in the place of the NAS information) associated with a special UE ID IE (e.g. all zeros, or a UE ID of a different length)
  d. In a paging message indicated by the short paging DCI.
    i. For example, the relay UE may receive an indication in the short paging DCI, where such indication may indicate to the relay UE that the associated paging message is replaced or contains the active paging indication message.

e. Using a dedicated (special) RNTI—e.g. a Relay (R)-RNTI.
   i. A relay UE may be configured with a new RNTI (e.g. R-RNTI). The relay UE may receive the active paging indication message in a DCI or MAC CE obtained by decoding PDCCH with the R-RNTI.

Relay UE/WTRU Receives a Separate Active Paging Indication Message Based on its RRC State In one solution, a relay UE may receive a separate active paging indication message depending on its RRC state. Specifically, the relay UE may receive a first message when it is in RRC_IDLE, and/or may receive a second message when it is in RRC_INACTIVE, and/or may receive a third message when it is in RRC_CONNECTED. The contents/format of such message may be different. For example, the relay UE in RRC_IDLE may receive active indication for any PO configured by the network. On the other hand, a relay UE in RRC_CONNECTED may receive active indication associated with only a subset of the POs. Such subset may be indicated as part of the message. Such subset may be derived/based on information provided by the relay UE as described herein for further reducing the POs or UEs that the network needs to report in the active paging indication message.

Mechanisms for Determining/Receiving the UE/WTRU-PO Association

A Relay UE may determine whether to monitor a PO associated with another UE (e.g. a remote UE) depending on the whether the UE in question is connected or served by the relay UE. For example, a relay UE may serve a remote UE when the remote UE and the relay UE have a PC5-RRC connection. For example, a relay UE may serve a remote UE when the remote UE has indicated that it requests paging forwarding from the relay UE to which the remote UE is PC5-RRC connected.

A Relay UE may maintain an association of one or more PF, PO, or similar to a remote UE, possibly for all served remote UEs. For example, the relay UE may maintain the PO associated to each of its served remote UEs. For example, the relay UE may maintain a table/list of all attached/served remote UEs and their corresponding PO and/or DRX cycle. The relay UE may determine the remote UE to PO association based on information obtained by any of the following:

a. Directly received from the remote UE itself.
   i. For example, the relay UE may receive the PO (e.g. in the form of an index to a table or an indirect mapping to the PO) from the remote UE in PC5-RRC signaling. For example, the remote UE may send the PO to the relay UE when the remote UE establishes a PC5-RRC connection with a relay UE. For example, the remote UE may send the PO to the relay UE when the PO changes (e.g. due to RRC reconfiguration).
   ii. For example, the relay UE may receive information allowing it to compute the PO from the remote UE in PC5-RRC signaling. For example, such information may be a UE/WTRU ID, value of UE mod K (e.g. UE mod 1024), or a subset of the bits of the UE ID of the remote UE.
b. Directly received from the network.
   i. For example, the relay UE may receive the PO for a remote UE from the network, for example, in an RRCReconfiguration message. For example, the relay UE may receive the PO following the transmission of SidelinkUEInformation to the network for indicating a new/released PC5-RRC connection.
c. Computed by the relay UE.
   i. For example, the relay UE may receive the remote UE's UE ID (either from the remote UE or the NW) and may compute the PO based on the paging configuration, using the remote UE's UE ID.

In each of the above mechanisms (either reception from the network, or from a remote UE), the relay UE may further receive:

a. Information about which specific POs it should/should not monitor.
b. Information about whether monitoring of POs for a specific remote UE is necessary or not.
   i. The relay UE may derive such information indirectly from the PC5-RRC link monitoring state. Specifically, the relay UE may receive (from the network, the remote UE, or from upper layers) an indication that the PC5-RRC link has been released. The relay UE may then stop monitoring all POs associated with the remote UE.

When referenced herein, a PO associated with a remote UE may include of any of the above associations. The relay UE may further receive the DRX cycle of the remote UE, as well as possibly other DRX parameters allowing the relay UE to calculate the associated PO for that remote UE, either from the remote UE itself, or from the network, similar to above.

Remote UE/WTRU Determines which DRX Cycle/Information to Send to the Relay UE/WTRU In one solution, a remote UE may send one or more DRX cycles to the relay UE. In one example, the remote UE may send both its NAS-layer configured DRX cycle, and its RRC-layer configured DRX cycle to the relay UE. The UE may send only one of these if not configured with the other. If not configured with any of these, the remote UE may indicate such (either by sending an empty field/message, or an explicit indication). Alternatively, the remote UE may send the default DRX cycle if not configured with any of them. In another example, the remote UE may send the minimum of the DRX cycles to the relay UE. Specifically, the relay UE may send the minimum of the NAS-layer configured DRX cycle and the RRC-layer configured DRX cycle only. In such case, the relay UE may determine the DRX cycle of the remote UE as the minimum of the DRX cycle received from the remote UE, and the default DRX cycle. If no DRX cycle is received from the remote UE, the relay UE may use the default DRX cycle. In another solution, the relay UE may send the minimum of the NAS-layer configured DRX cycle, RRC-layer configured DRX cycle, and default DRX cycle. The relay UE may use the DRX cycle received from the remote UE to determine the DRX cycle to be used to determine the remote UE's paging occasions.

A remote UE may further determine which DRX cycle information to send to the relay UE based on its RRC state. For example, if the remote UE is RRC_IDLE, it may send the NAS-configured DRX cycle, if one is configured, or the minimum between the NAS value and the default. If the remote UE is in RRC_INACTIVE, it may send the NAS configured DRX cycle (if configured) and RRC configured DRX cycle (if configured), or the minimum of the NAS and RRC configured DRX cycle, or the minimum of NAS configured RRC configured DRX cycle, and default.

A remote UE may send the DRX cycle upon connection establishment, upon change of the DRX cycle (e.g. the minimum computed) upon request by the relay UE, or upon change of RRC state of the remote UE.

Remote UE/WTRU may determine whether to send full or partial UE/WTRU ID

A remote UE may send either the full UE ID (I-RNTI and/or 5G-S-TMSI) or the partial UE ID (I-RNTI and/or 5G-S-TMSI–mod N). A remote UE may send only one of these to a given relay. A remote UE may determine whether to send the full IDs or partial IDs based on any or a combination of:
  a. Network configuration:
     i. For example, the remote UE can be (pre)configured with a list of "trusted" relay IDs (e.g. L2 ID) in SIB or dedicated signaling. If the remote connects to a relay from the "trusted" list, the remote UE may send the full UE ID.
     ii. For example, if the remote UE is not configured with a trusted UE list, the remote UE may send the partial ID. Following connection establishment with the relay, the remote UE may determine the relay UE a trusted relay (using other methods described herein), after which the remote UE may send the full UE (either immediately, upon change of the UE ID(s), or upon request by the relay).
  b. From upper layers (e.g. Following network access/authentication or the remote or relay)
     i. For example, the remote UE may be informed from upper layers (e.g. NAS layer) of the trusted UE IDs. Such may occur following initial access to the relay UE or authentication to the core network. Similar to other embodiments, the remote UE may first send the partial ID, and send the full ID once the relay has been determined as trusted.
  c. Based on previous connections with a relay UE
     i. For example, a remote UE may maintain a list of trusted L2 IDs (following connection and authentication). If the remote UE initiates a connection to the same L2 ID as in the past, the remote UE may assume a trusted relay UE.

A relay UE may be connected to remote UEs which have provided the full UE ID, and/or remote UEs which have provided the partial UE ID. The relay UE may read and forward paging differently depending on the specific case/UE (whether it has the full or partial ID).

For a remote UE which provides the partial ID, the relay UE may forward any message received in the PO associated with the remote UE to the remote UE, regardless of its contents. The relay UE may include also the list of UE IDs included in the paging message along with the forwarded paging message from the network.

For a remote UE which provides the full UE ID, the relay UE may decode the paging message, and send the PC5-RRC paging message with the contents described herein (i.e. possibly without the UE IDs). In addition, the relay UE may determine other fields (e.g. the paging type) to be included in the paging message in this case (but not in the other case).

Relay UE/WTRU Sends Updated Linking Information to the NW

In one solution, which can be used in combination with the previous solution, a relay UE may send remote UE linking information to the network. Such information, for example, can be used to reduce/optimize the size of the active paging indication message. Specifically, a relay UE may send a list of connected remote UEs to the network. For example, a relay UE may send an indication that a UE, or more than one UE, are connected/disconnected from the relay UE (from the point of view of the PC5-RRC message).

Rules for Sending the Message

A relay UE may send the updated linking information based on one or more of the following rules or combination of such rules:
  a. Periodically.
     i. For example, the relay UE may be configured with a periodicity for reporting the linking information.
     ii. For example, the periodicity of reporting may further depend on:
        1. The number of connected remote UEs.
        2. The RRC state of the relay UE.
        3. The RRC state of one or more of the remote UEs.
        4. The QoS/services being relayed (e.g. established radio bearers at any of the remote UEs and/or the relay UE).
  b. Upon the connection of a new remote UE.
  c. Upon the disconnection (release) of one or a configured number of PC5-RRC connections with remote UEs.
  d. Dependent on the size of the active paging indication message (e.g. the number of bits in the bitmap) and/or whether the joining/leaving of remote UEs results in a change in the size of such message by a certain amount.
  e. Dependent on the power preference/capability at the remote UE.

Contents of the Message

The relay UE may include any of the following in the updated linking message:
  a. The list of UE IDs associated with connected remote UEs (where such may be L2 source/destination ID, I-RNTI, 5G-S-TMSI, etc.
  b. The UE IDs which have recently (e.g. since the last transmission of the message) joined/left the relay UE, along with an indication of joined or leaving for each UE.
  c. The list of all POs associated with each of the linked remote UEs.
  d. The POs of the UEs which have recently (e.g. since the last transmission of the message) joined/left the relay UE, along with an indication of joining/leaving for the specific PO.

How to Send the Message

The relay UE may send the message using any of the following:
  a. UL RRC message transmission (e.g. while the relay UE is in RRC_CONNECTED).
     i. For example, the relay UE can send a SidelinkUE-Information message.
  b. Resume procedure or RAN-based notification area update (RNAU)-like procedure.
     i. For example, the relay UE in RRC_INACTIVE may trigger a resume procedure, and include the information in the RRC resume request message, or another message transmitted along with the resume request message.
  c. Data transmission in INACTIVE.
  For example, the relay UE (e.g. in RRC_INACTIVE) may transmit small data which contains an RRC message containing the message.
  d. SI-request-like procedure.
     i. For example, the relay UE (e.g. in RRC_IDLE/RRC_INACTIVE) may transmit an SI-request like procedure, where the requested System Information (SI) is replaced with the linking information.

Relay/Remote UE/WTRU Sends a Paging Change Request

In one solution, a relay UE may receive a paging change request from a remote UE. Upon reception of such request, the relay UE may change from one paging reception method/option to another for the specific remote UE. Specifically, the relay UE may change from expecting paging for the remote UE from the remote UE's PO, to expecting paging for the remote UE in its own PO (or vice versa). For example, the relay UE may start/stop monitoring the paging occasions associated with the remote UE in question upon such reception of the paging change request. A relay UE may inform the network upon reception of an expected paging change from a remote UE. For example, a relay UE may transmit an RRC message to the NW upon reception of a paging change request from a remote UE. For example, a relay UE may initiate/resume an RRC connection upon reception of a paging change request from a remote UE. For example, a relay UE may initiate an SI-request-like procedure, or data transmission in INACTIVE procedure upon reception of a paging change request message. The relay UE may include the UE ID (e.g. L2 source/destination ID) of the requesting remote UE in the message.

Following reception of the message and/or informing the network, the relay UE may change its paging monitoring behavior. The relay UE may perform any of the following:
 a. Start/stop monitoring the PO associated with the remote UE that requested the change, possibly in the case where there are no other remote UEs associated with the PO, or in the case where no previous remote UEs are associated with the PO.
 b. Decode the active paging indication message from the network differently, such as:
   i. Change the expected location of the expected paging indication message.
   ii. Change the encoding (e.g. number of bits, size etc.) of the message.
   iii. Change the mapping/interpretation of the encoding to each remote UE.

A remote UE may send a paging change request when it needs to receive paging (or no longer needs to receive paging) from the relay UE. Such request may be triggered due to the remote UE no longer needing to receive paging. Such request may be triggered due to the remote UE starting/stopping paging reception from Uu directly when also connected via the relay, in which case, reception via the relay is not needed. Such request may be triggered as a result of conditions whereby redundancy of paging reception (via Uu directly and via the relay) are required. A remote UE may determine whether to obtain paging directly via Uu and/or obtain paging via a relay and/or whether to send a paging change request based on one or more, or a combination of the following conditions or change in such conditions:
 a. Conditions of the Uu link.
   i. For example, the Uu RSRP is above/below a threshold. For example, a remote UE may monitor paging on Uu when the Uu RSRP is above a threshold and may monitor paging from the relay when the Uu RSRP is below a threshold. When the remote UE changes from monitoring paging on Uu vs sidelink, it may inform the relay UE by sending a paging change request.
   ii. For example, the UE triggers radio link failure (RLF) or SL-RLF. For example, a remote UE may move from monitoring paging on SL to monitoring paging on Uu when SL RLF is triggered at the remote UE. The remote UE may further indicate such to the relay UE.
 b. Conditions at the UE related to power consumption or temperature.
   i. For example, the UE indicates overheating.
   ii. For example, the UE power consumption preference changes. For example, a remote UE may move to monitoring paging on SL when it receives such indication and may inform the relay.
 c. Conditions on Uu between the relay and the network.
   i. Such conditions/measurements may be provided by the relay UE to the remote UE for further deciding which link to monitor for paging.
 d. Conditions associated with the RRC state of the remote UE.
   i. For example, the remote UE may send an indication when it moves from RRC_CONNECTED to RRC_IDLE/RRC_INACTIVE or vice versa. This indication may be a message/signaling sent from the remote UE to the relay UE as an indication of a change of state of operation of the remote UE. An example indication of a change in state may be a PC5-RRC message/signaling that has direct or implied state indication information. For example, the relay UE may monitor the POs of the remote UE when the indication informs the relay UE that the remote UE is in RRC_IDLE/RRC_INACTIVE. The relay UE may not monitor the POs of the remote UE when the remote UE is in RRC_CONNECTED.
 e. Conditions on the sidelink.
   i. For example, the measured channel busy ratio (CBR) moves above/below a threshold.
   ii. For example, the SL RSRP is above/below a threshold. For example, the remote UE may move to monitoring paging on Uu when CBR exceeds a threshold. For example, the remote UE may move to monitoring paging on Uu when SL RSRP is below a threshold and may monitor paging from the relay when SL RSRP is above a threshold.
 f. Conditions related to active bearers.
   i. For example, the remote UE is configured with a bearer that requires/prioritizes paging reception over Uu, and/or over sidelink.
   ii. A remote UE may send the indication to the relay UE if such bearer is established/released/activated/deactivated.
 g. Conditions related to remote/relay UE mobility/coverage.
   i. For example, the remote UE moves from the coverage of the same/different gNB to a different/same gNB, RAN area, or tracking area with respect to the gNB to which the relay UE is connected/in coverage of.
   ii. For example, the remote UE is informed of a change in the coverage/connectivity of the relay UE (e.g. via reception of system information) such that the relay/remote are under the coverage of the same/different gNB, RAN area, or tracking area.
 h. Conditions associated with the Tracking Area/RAN Notification Area (TA/RNA) of the remote UE.
   i. For example, the remote UE may monitor paging directly on Uu or on both Uu and relay if the cell on the direct interface is in the configured TA/RNA of the UE. Otherwise, the remote UE may monitor paging only from the relay.
   ii. A remote may send an indication to the relay UE upon mobility in which the remote UE moves into/out of its TA/RNA with respect to the direct link.

The above conditions or combination of conditions may also be used to determine cases where the remote UE may monitor paging from both Uu and from the relay simultaneously. For example, a remote UE may monitor paging from both Uu and SL if the SL RSRP is below a threshold and/or the Uu RSRP is below a threshold. This may be motivated to receive coverage extension of the paging message.

A remote UE may, in combination with the other solutions, send a paging change request to the NW, via Uu, or a relayed channel via the relay. A remote UE may receive/expect paging via Uu and/or relay based on any of the conditions above. For example, the remote UE may receive paging via Uu and the relay if the Uu RSRP is below a first threshold and above a second threshold, while the SL RSRP is above another threshold. The remote UE may send a paging change request prior to a change in the expected paging source.

Remote UE/WTRU can Indicate a Subset of POs (or Beams) in the Paging Change Request In one solution, a remote UE can indicate a subset of POs which it wants the relay UE to monitor in its behalf. Such subset of POs may be associated with a finite period of time (e.g. nextxDRX cycles). Such subset of POs may be a regularly occurring subset of the POs of a remote UE which the relay UE should/should not monitor. A remote UE may further indicate a subset of beams or slots within the PO for the relay to monitor on its behalf.

A remote UE may determine the subset of POs, slots, or beams that the relay UE should monitor based on determining a percentage of such opportunities based on conditions given above. Specifically, for a given condition (e.g. a measured value of RSRP) the remote UE may be configured with a percentage of POs to monitor and may provide the POs and/or the percentage to the relay UE. The relay UE may then monitor the required POs or use the obtained percentage to derive the remote UE's POs to monitor.

In another solution, a remote UE may determine that it will be unable to monitor its POs in Uu or SL for a period of time or for a sequence of slots. A remote UE may indicate such period of time or sequence of slots to the relay UE. For example, such unavailability may be caused by:
  a. The remote UE determining a conflict between a SL transmission/reception and the remote UE's PO.
    i. For example, a remote UE may need to receive SL during one or more POs (e.g. for another unicast link associated with a SL service) and may not be able to receive paging on Uu in those POs.
    ii. For example, a remote UE may perform/plan a transmission on the SL slot associated with reception of paging and may receive paging for that PO directly from Uu.
  b. The remote UE needing to prioritize SL over Uu reception for a period of time (possibly associated with a conflict between SL and Uu).
  c. The remote UE needing to turn off Uu monitoring for some time (e.g. due to power saving preference, indication within the UE, etc.).

In another solution, a remote UE may indicate to the relay UE whether it is able to monitor paging directly on Uu or not. Such determination may be made based on the conditions described above. In such solution, whether the remote UE performs paging monitoring over Uu directly may depend on subsequent indication/command from the relay UE and/or the network. Alternatively, the remote UE may be configured with a default behavior (always/never monitor paging on Uu, or using rules described herein to determine) when it is able to monitor paging directly on Uu.

Relay UE/WTRU Indicating Ability/Inability to Monitor Paging on Behalf of a Remote UE/WTRU.

In a similar solution, the relay UE may inform a remote UE of the relay UE's inability to monitor paging, possibly for a subset of POs/slots. A relay UE may provide such indication only when the remote UE indicates that it is able to monitor paging directly on Uu. Specifically, such indication to the remote UE may result in the remote UE monitoring paging (possibly on a subset of slots) directly via Uu. Similar conditions to those described for the paging change request or indicating a subset of slots can be used by the relay UE to indicate to the remote UE of the relay UE's inability to monitor paging for the remote UE. For example, the relay UE may prioritize SL transmission/reception over Uu for a period of time in which the remote UE's paging may be missed. The relay UE may then send such indication to the remote UE, possibly indicating the missed POs.

A remote UE, upon reception of such indication, may perform any of the following:
  a. If the remote UE is able to receive its paging via Uu, the remote UE may monitor paging over Uu directly, possibly only for the POs sent by the relay UE in the indication.
  b. If the remote UE is unable to receive its paging via Uu, the remote UE may perform any or a combination of the following:
    i. Establish/resume an RRC connection via the relay (specifically to avoid potentially missed paging messages transmitted by the network).
    ii. Trigger a relay reselection (specifically to find an alternate relay which can monitor paging for the remote UE. For example, the remote UE may trigger a relay and/or cell reselection. If the remote UE is unable to find a suitable relay, it may initiate an RRC connection establishment/resume to the currently connected relay.

Relay UE/WTRU Initiates a Connection/Resume Procedure Upon Reception of Paging.

In one solution, a relay UE in RRC_IDLE/RRC_CONNECTED may initiate a connection/resume procedure upon reception of a paging message intended for a remote UE or received in one of the POs associated with a connected remote UE.

A relay UE may further decide whether to perform such connection establishment based on one or more, or a combination of the following conditions:
  a. Indication in the paging message.
    i. For example, the relay UE may receive an indication in the paging message which instructs the relay UE whether or not to initiate connection/resume.
  b. RRC state of the relay UE.
    i. For example, the relay UE may initiate a connection establishment if it is in RRC_IDLE, but not initiate such connection if it is in RRC_INACTIVE.
  c. UE_ID associated with the received paging message.
    i. For example, the relay UE may initiate a connection establishment if received a UE_ID (e.g. L2 source/destination ID, 5G-S-TMSI, I-RNTI) which is associated with one of its associated remote UEs.
  d. Established bearers/LCHs at the remote UE, or mapped onto Uu LCHs
    i. For example, the relay UE may initiate a connection establishment of a connected remote UE (possibly identified in the paging message) has a LCH which is mapped to a Uu LCH which is configured to (or requires) the relay UE to perform connection establishment/resume at paging.

ii. For example, the relay UE may initiate a connection establishment/resume if the remote UE has at least one configured LCH (e.g. PC5 LCH) having a priority above a threshold or configured with a property that requires connection establishment/resume by the relay.
e. UE ID Type in the paging message.
  i. For example, the relay UE may initiate a RRC connection/resume if at least one of the UE IDs in the paging message, or an associated UE_ID, is associated with a I-RNTI.

Relay UE/WTRU Monitors Paging Associated with a Remote UE/WTRU for a Finite Time Period In one solution, a relay UE may monitor for paging associated with a remote UE for a finite time period since the last occurrence of a specific event. Such behavior may be further limited to a subset of scenarios such as:
a. The relay UE is configured whether to perform finite time monitoring or not based on NW configuration.
b. The relay UE is configured to perform finite time monitoring depending on the RRC state of the relay UE and/or remote UE.
  i. For example, the relay UE performs finite time monitoring of paging for the remote UE when the remote UE and/or the relay UE is in RRC_IDLE, otherwise, it performs monitoring of paging for the remote UE without relying on such event/timer.
  ii. For example, the relay UE may be configured with a timer for remote UE paging monitoring. The relay UE may monitor paging associated with the remote UE as long as the timer is running. The relay UE may reset the timer upon the occurrence of one or more events. Such event may consist of any of the following: Reception of a transmission, data, control, HARQ feedback, Channel State Information (CSI) request/report, SCI, etc. from the remote UE. Such may be associated with a specific type of transmission only. For example, the timer may be reset upon reception of HARQ ACK only, or HARQ ACK or HARQ NACK.
c. Reception of a paging message from the network, possibly associated with the remote UE or the remote UE's PO.
d. Reception of an indication or message from the network, possibly associated with the remote UE.
e. Reception of a SL WUS (wakeup signal) use for the purposes of SL DRX control or reception of acknowledgement to such SL WUS.
f. Reception of a MAC CE (such as a SL DRX command MAC CE).

Relay UE/WTRU Monitoring for Paging and/or System Information (SI) Modification May Depend on Relay/Remote UE/WTRU RRC State and/or Paging Change Request. Relay UE/WTRU Determining the Remote UE/WTRU RRC State.

The relay UE may be informed of the state of the remote UE:
a. From the network (e.g. via dedicated RRC signaling)
b. From the remote UE (e.g. via PC5-RRC signaling)
c. By implicitly determining the remote UE's RRC state based on:
  i. State transition signaling relayed by the relay UE. For example, a relay UE may determine that the remote UE has moved from RRC_IDLE/RRC_INACTIVE as a result of reception.
  ii. Presence, at the relay UE, of an adaptation layer established and/or relaying configuration for the remote UE. For example, the relay UE may determine that the remote UE is in RRC_CONNECTED based on whether it has been configured (by the network) with a relaying configuration, such as an adaptation layer configuration, a mapping in ingress to egress LCHs, etc.
  iii. PC5 signaling or transmission/behavior by the remote UE which is associated with RRC_CONNECTED.
    1. For example, the relay UE may determine the Uu RRC state of the remote UE based on the SL DRX configuration with the remote UE. Specifically, if the remote UE requests/configures SL DRX over the unicast link with the relay UE, the relay UE may assume the remote UE is in RRC_CONNECTED.
    2. For example, the relay UE may determine that the remote UE is in RRC_CONNECTED based on the presence of regular SL transmissions and or configuration (e.g. configuration of SL RSRP reports, regular presence of SL CSI requests/reports, a timer associated with SL data transmission between the remote UE and relay UE, etc.).

Relay UE/WTRU Determining which Paging Occasions to Monitor

Paging monitoring and/or SI monitoring behavior of the relay UE may depend on the RRC state of the relay and/or remote UE. A relay UE may monitor the paging occasions, or subset of paging occasions as per methods described herein (indicated by the network—in the active paging indication—or the remote UE—in the paging change request) for all remote UEs which are known to be either RRC_IDLE/RRC_INACTIVE.

Alternatively, a relay UE may monitor the paging occasions, or subset of paging occasions, for all PC5-RRC connected remote UEs whose paging occasions are requested to be monitored, based on indication from the network and/or reception of the paging change indication message.

A relay UE may stop monitoring paging occasions for all PC5-RRC connected remote UEs when the relay UE is itself in RRC_CONNECTED. Specifically, a relay UE may, in this case, rely on dedicated RRC signaling to receive the paging message for the remote UE. A relay UE may receive a paging message addressed to a remote UE in a dedicated RRC message. Upon reception of such paging message, the relay UE may forward the paging message in PC5-RRC signaling to the addressed remote UE. For example, the dedicated RRC message containing the paging message may include the UE_ID of the remote UE to which the paging message is intended for.

Relay UE/WTRU Determining how to Handle SI Modification Indication in Paging

In one solution, a relay UE's management/handling of reception of paging and/or SI modification indication from the network may depend on the relay/remote UE's RRC state. As expressed above, the remote UE may send an indication via messaging/signaling when the remote UE changes state. One example may be a state change indication message/signaling occurring when the remote UE moves from the RRC_CONNECTED state to RRC_IDLE/RRC_INACTIVE state or vice versa. Specifically:
a. If the relay UE is in RRC_CONNECTED, the relay UE may forward SI indication and/or information of the changed SI and/or actual SI depending on the RRC state of the remote UE. The SI indication information may indicate the availability of changed (updated) SI information (i.e. the actual, new SI information) from the network. Specifically:
  i. If the remote UE is in RRC_CONNECTED, the relay UE may forward the SI indication to the RRC_CONNECTED remote UE. The relay UE may send the indication immediately or may send it when the relay UE acquires the updated SI. The relay UE may, additionally, send a list of modified SI to the remote UE based on the value tag in SIB1. Specifically, the relay UE may determine the SIs whose value tag(s) have changed, and send the change SIs (or a subset, for example, based on those the remote UE is interested in) and/or the value tags of the changed SIs to the remote UE.
  ii. If the remote UE is in RRC_IDLE/RRC_INACTIVE, the relay UE may not forward the SI indication to the remote UE. The relay UE may instead send the changed SI itself (based on the value tag(s) that were changed) to the remote UE. Thus, the RRC idle state or RRC inactive state change indication (moving from RRC connected to RRC idle or inactive) may be associated with the relay UE sending the changed (updated, actual) SI information to the remote UE. Alternatively, if the relay UE is in RRC_CONNECTED, the relay UE may, following reception of the SI indication, first receive/determine the actual SIs which have changed. Specifically, the relay UE may determine the SIs changed based on the value tag received in SIB1. Based on the changed SI(s), the relay UE may send the changed SI(s) (or a subset, for example, based on those the remote UE is interested in).
  b. If the relay UE is in RRC_IDLE/RRC_INACTIVE, the relay UE may forward the changed SI to all remote UE, regardless of their RRC state. Specifically, the relay UE may determine the list of modified SIs (based on the value tag in SIB1 and/or the interested SIs at the remote UE) and may forward all (interested) SIs to each PC5-RRC connected remote UE.

In another solution, a relay UE's management/handling of reception of paging and/or SI modification indication from the network may depend on whether the SI which is modified is of interest to the relay UE or needs to be received by the relay UE. Specifically:
  a. If the relay UE receives an SI change indication, and determines that (possibly all of) the changed SI is of interest to the relay UE, the relay UE may forward the changed SI to the remote UE(s) without forwarding the SI modification indication. On the other hand, if the relay UE determines that the changed SI is not of interest to the relay UE (and possibly is of interest to the remote UE, and possibly the remote UE is in RRC_CONNECTED), the remote may forward the SI change indication only. Possibly, if the relay UE determines that the SI change indication is not of interest to the relay UE, and the remote UE (or at least one remote UE, or at least N remote UEs) is in RRC_IDLE/ RRC_INACTIVE, the relay may acquire and forward the changed SI.

In another solution, a relay UE's management/handling of reception of SI modification indication from the network may depend on whether the remote UE is interested in the SI which has changed. Specifically:
  a. A relay UE may maintain a list of interested SI for each remote UE, and may forward the modified SI and/or the SI change indication only when the changed SI is of interest to (possibly at least one of) the remote UE(s). Otherwise, the relay UE may choose not to forward the SI indication and/or changed SI.

In another solution, a relay UE's management/handling of reception of SI modification indication from the network may depend on the number or type of SIBs/SI that are changed and/or are SI/SIBs of interest from the remote UEs. For example, the relay may forward the changed SIs if the number of changed interested SIBs/SIs is below a configured threshold. Otherwise, the relay UE may forward only the SI modification notification. For example, the relay UE may receive and forward the changed SIBs for certain specific SIBs or SIB types, while for either SIBs or SIB types, the relay UE may forward the SIB modification indication. For example, the relay UE may always forward the public warning system (PWS) SIBs or the positioning SIBs, but may forward the SI modification indication (and not the SIB), possibly for certain SIBs only.

Combinations of the above solutions, in terms of the conditions for forwarding SIBs or paging messages, are also possible.

In another solution, a relay UE's management/handling of paging and/or modified SI may depend on whether the relay UE is configured with the common search space in the current DL bandwidth part. Such solution may be specific to the relay UE in RRC_CONNECTED. Specifically:
  a. If the relay UE is configured with the common search space in the current DL bandwidth part, the relay UE may use one of the solutions defined above.
  b. If the relay UE is not configured with the common search space in the current DL bandwidth part.
    i. The relay UE may receive any modified SI directly from the network using dedicated RRC signaling. In such case, the relay UE is not expected to monitor the paging occasions of the remote UE (for the case of paging reception). Upon reception of the modified SI, if the modified SI is also considered to be of interest to a remote UE, the relay UE may send the modified SI to the remote UE in PC5-RRC signaling.
    ii. Alternatively, the relay UE may receive any modified SI directly from the network using dedicated RRC signaling, and, upon reception of the modified SI, may send the SI to a remote UE depending on the RRC state of the remote UE. Specifically:
      1. If the remote UE is in RRC_IDLE/RRC_INACTIVE, the relay UE may send the modified SI to the remote UE in PC5-RRC signaling.
      2. If the remote UE is in RRC_CONNECTED, the relay UE may send an indication of modified SI, and/or the list of SI(s) which are modified to the remote UE in PC5-RRC signaling.

Relay UE/WTRU Receiving Paging in Dedicated Signaling May Respond to the Network in Case of Success/Error The network may send paging using dedicated RRC signaling to a relay UE in RRC_CONNECTED, but the remote UE may no longer be RRC_CONNECTED to the given relay UE. In such case, it should be possible for the network to be aware of this case.

In one solution, the relay UE may send a confirmation message (in case the remote UE is/can be successfully reached) or a failure message (otherwise). The relay UE may send the confirmation/failure message:
  a. Upon reception of the dedicated paging message from the relay UE
    i. For example, if the remote UE being paged by the network in the dedicated paging message received by the relay UE is not PC5-RRC connected to the relay UE, the remote UE may send a failure message to the network. If the remote UE is connected, the relay UE may send a confirmation message to the network.
b. Upon attempt to forward the paging message over PC5-RRC.
   i. For example, the remote UE may expect an acknowledgement (e.g. in RLC or in PC5-RRC) upon forwarding the paging message to the remote UE. If an acknowledgement is not received, the relay UE may send a failure message to the network. Otherwise, if an acknowledgement is received from the remote UE, the relay UE may send a confirmation message.

The dedicated RRC message and response from the relay UE can take the form of a request/response RRC signaling (e.g. RRCReconfiguration and Confirm/failure messages, or a new RRC message combination for delivering paging and corresponding response). Alternatively, the remote UE may send an UL RRC message (e.g. ULInformationTransfer or similar) upon failure to deliver the paging to the remote UE, and not send any message in the case of success.

Contents of the Dedicated Uu RRC Message Sent to the Relay UE/WTRU from the Network The dedicated RRC message may contain any of the following information:
a. The UE ID(s) of the remote UE(s) being paged by the network
   i. The UE IDs may be the I-RNTI, 5G-S-TMSI, or local UE ID of the remote UE.
   ii. The relay UE may send a unicast PC5-RRC message to the remote UE(s) who's UE ID(s) are included in the paging message.
   iii. The relay UE may determine the paging type (as described herein) to be included in the forwarded paging message based on whether the received ID for that UE is an I-RNTI or 5G-S-TMSI. Such behavior may be the same for the case where the relay UE received paging while monitoring the remote UE's PO (i.e. not in dedicated signaling). Alternatively, the dedicated Uu RRC message may contain the remote UE ID (possibly the local ID rather than one of the paging IDs) as well as a paging type (RAN paging or CN paging) and the relay may reflect this paging type in the forwarded paging message.
b. The link/path over which the remote UE should initiate connection establishment (e.g. direct, via relay, etc.)
   i. The relay UE may forward the link/path to the remote UE.
   ii. The remote UE may, upon reception of the link/path indicated from the relay, initiate a connection establishment/resume via that link.
c. The relay UE ID via which the remote UE should initiate connection establishment in response to reception of the paging
   i. The relay UE may forward the relay UE ID to the remote UE, possibly of the relay UE ID is different than its own ID (i.e. another relay being selected by the network). In addition, in the case that a different relay is being selected, the relay UE may release the PC5-RRC connection following forwarding of the paging to the remote UE
   ii. The remote UE may release the PC5-RRC connection if the indicated relay UE ID does not match the its current relay. The remote UE may then initiate a connection establishment via the connected relay, or the indicated relay, based on whether/which UE ID is indicated in the forwarded paging message on PC5-RRC.
d. A CBR threshold for deciding which path/link to choose
   i. The relay UE may forward such threshold to the remote UE
   ii. The remote UE may determine whether to initiate connection establishment via direct or indirect based on the measured CBR in comparison to the threshold (e.g. initiate via the direct path if CBR>threshold)

Relay UE/WTRU Determines the Content of the PC5-RRC Message Containing the Forwarded Paging The PC5-RRC message indicating a paging to the remote UE (sent by the relay UE) may contain any of the information received by the relay UE and forwarded to the remote UE. In addition, the relay UE may include the following information in the PC5-RRC message:
a. Paging type (e.g. CN paging, RAN paging). Such field may be sent as an enumerated type.
   i. For example, the relay UE may determine whether the paging is CN paging or RAN paging, and indicate such to the remote UE, based on:
      1. The type of ID received from the network in the dedicated Uu RRC message. For example, the relay UE may determine the type of paging based on whether it receives an I-RNTI or 5G-S-TMSI.
      2. Explicit/implicit indication in the dedicated Uu RRC message. For example, the relay UE may receive the local UE ID in the dedicated Uu RRC message along with an indication of whether it is a CN paging or RAN paging which should be sent. The relay may then forward such indication.
   ii. For example, the remote UE, upon receiving a paging message with paging type of CN paging or RAN paging, may consider it as though it is receiving CN paging or RAN paging respectively. A remote UE in RRC_IDLE that receives RAN paging may ignore the message. Alternatively, it may send a PC5-RRC message to the relay UE indicating the error condition. Alternatively, it may initiate a connection establishment procedure to the network, possibly indicating the error condition to the network (in a cause value or an RRC message/field).
   iii. For example, a remote UE in RRC_INACTIVE which receives a paging message of type RAN paging may initiate a resume procedure. A remote UE in RRC_INACTIVE which receives a paging message of type CN paging may transition to RRC_IDLE, release its context, and initiate a connection establishment procedure.
b. SI change/PWS notification indication.
   i. For example, the relay UE may receive an SI change indication along with (or at a similar time as) a paging message. If the relay UE receives two separate paging messages within a configured time window (e.g. a paging message for a remote UE, and an SI modification message) the relay UE may combine the two indications into a single PC5-RRC message. For example, following reception of a first message (e.g. paging for a remote UE), if a second message (PWS notification) is received before the relay UE generates the PC5-RRC message, the relay UE may send both in a single PC5-RRC message.
c. SI or portions of SI, possibly associated with SI which was modified by the network and for which SI modification was sent, possibly associated with the SI a particular remote UE is interested in.
　i. For example, the relay UE may indicate in the paging forwarding message that the included SI corresponds to modified SI.
　ii. For example, the remote UE, when receiving a paging message (e.g. a PC5-RRC message dedicated to the forwarding of paging) which contains SI will assume the SI corresponds to changed SI, and will update its own SI based on the contents of the paging message.
d. Specific SIBs or SI which were modified
　i. For example, the relay UE, when receiving a paging message indicating an SI modification, may read SIB1 to determine the modified SI/SIB, and may then indicate in the PC5-RRC message, the modified SIBs/SI to the remote UE.
e. SIB1, or portion of SIB1 (e.g. validity tag, area ID, etc).
　i. For example, whenever an SI modification is received, the relay UE may always forward the complete SIB1, or may forward the portions of SIB1, such as the validity tag, possibly associated with only the SIBs which are modified, or all SIBs.
f. UE ID of the remote UE being paged. For example, the relay may include only the UE ID of the remote UE being paged into the PC5-RRC message to that relay UE, and not include the other UE IDs in the paging record. The relay UE may repeat the transmission of the PC5-RRC message to each of the remote UEs included in the paging message, and include only the remote UE ID corresponding to that remote UE in the respective message.

Timing of Transmission of the Forwarded Paging Message May Depend on its Contents A Relay UE transmitting paging in mode 2 may be configured with a time window for forwarding a paging message over PC5 RRC. Such time window may further be dependent on whether the paging message is carrying a UE paging, an SI change indication, or an PWS notification. Such paging message may determine the minimum/maximum amount of time the UE has before generating the PC5-RRC message to forward the paging and/or the resource selection window for transmission of the paging message. As described herein, the relay UE may combine paging messages (e.g. include a paging message with an SI change indication or PWS notification) if the messages are received within overlapping windows.

In one example, a relay may forward certain paging messages immediately, and other paging messages after a predefined or configured time period. For example, a paging message containing PWS notification and/or UE paging may be forwarded immediately, while paging messages containing SI modification may be forwarded only at (or preconfigured time) before/after the next modification period.

Timing of Transmission of the Forwarded Paging Message May Depend on the SL DRX Active Time of the Remote UEs/WTRUs In another example, a relay UE may forward paging messages only during the active time (e.g. defined by SL DRX) of the corresponding remote UE to which the paging message is being forwarded. Specifically, if the relay UE receives a paging message to be forwarded to a remote UE during the remote UE's inactive time, or when the remaining time in the active time of the remote UE is smaller than a configured/predefined threshold, the relay UE may delay transmission of the paging message until the subsequent active time of the remote UE.

In another example, a relay UE may forward SI modification to all remote UEs in groupcast (e.g. with a groupcast L2 ID). The relay UE may wait for the groupcast specific active time, or a time when all remote UEs are active, in order to forward SI modification.

Relay UE/WTRU Itself Receiving Paging while in INACTIVE May Send an Indication to a Remote UE/WTRU In one solution, a relay UE, upon reception of paging intended for the relay UE itself, may send an indication to one or more remote UEs. Such indication may be in the form of a PC5-RRC message, such as a release message, or a SL reconfiguration message. Such message may be in the form of a SL MAC CE, or SCI transmission dedicated for this purpose.

The relay UE may send such message on sidelink in certain cases, which may depend on any of the RRC state of the relay UE and/or remote UE, the information received in the paging message by the remote UE, etc. For example:
　a. (Transition to IDLE due to CN paging) The relay UE in RRC_INACTIVE may send an indication to the remote UE when the relay UE receives a core network paging message. The relay UE may further send such message only to remote UEs which are in RRC_INACTIVE.
　b. (Reception of SI notification) The relay UE may send an indication to the remote UE when the relay UE receives a SI change notification in the paging message. The relay UE may further include the modified SI, (or a subset, for example, based on those the remote UE is interested in). Alternatively, the relay UE may not include the modified SI if it is aware that the remote UE is monitoring SI directly on Uu. The relay UE may determine that the remote UE is monitoring SI directly on Uu using similar messaging as for monitoring of paging from Uu, as described herein.

A remote UE, upon reception of such indication, may perform one or more of the following:
　a. Initiate a Uu RRC state transition (e.g. move from one Uu RRC state to another Uu RRC state).
　　i. For example, the indication may instruct the remote UE to transition to RRC_IDLE, if the remote UE is currently in RRC_CONNECTED.
　b. Initiate a relay reselection procedure and/or PC5-connection release and/or PC5-connection establishment with another relay and/or initiation of a resume procedure.
　　i. For example, the remote UE may be configured to attempt to remain in RRC_INACTIVE and may initiate a relay reselection procedure to find an alternate relay.
　　　1. The remote UE may be trigger relay reselection depending on the QoS of the established bearers and/or bearer configuration.
　　　2. The remote UE may be trigger connection establishment with another relay depending on whether the remote UE has determine/been provided with an alternate relay.
　c. Initiate a cell reselection procedure and/or resume procedure directly via Uu.
　　i. Similar restrictions/conditions/actions to relay reselection above may apply also to cell reselection.
　d. Temporarily suspend all relayed bearers, possibly until the reception of a subsequent RRC message from the relay UE.
　　i. For example, the relay UE, upon reception of the CN paging, may send a first indication to any remote UE in RRC_INACTIVE. Upon reception of the first indication, the remote UE may suspend all bearers (including SRB1) to avoid initiation of a resume procedure triggered by the remote UE. The relay UE, upon completion of a connection establishment triggered by reception of the CN paging, may transmit a second indication to the remote UEs. A remote UE, upon reception of the second indication, may resume all bearers (including SRB1) to re-enable triggering of a resume procedure by the remote UE.

Methods for Relaying Paging over SL

Relay UE/WTRU Determines a SL Time Window for Paging Transmission Based on PO and Relay Configuration.

In one solution, a relay UE may determine a finite time window for transmission/relaying of a paging message to one or more remote UEs. Such window may be define relative to the Uu PO associated with one or more connected remote UEs. Specifically, such window may start at an offset from a paging frame or paging occasion associated with one or more remote UEs. Such window may further depend on configuration at the relay UE.

In one option, the relay UE may determine the window (e.g. starting slot and duration) and send such window to the remote UE. The relay UE may transmit the window information via PC5-RRC message to the remote UE (e.g. in a Sidelink Configuration message). The remote UE may use this information to determine its sidelink monitoring time. Specifically, the remote UE may be required to monitor sidelink at least for the SL slots defined by the window. Alternatively, the remote UE may compute the same window as computed by the relay UE, based on reception of the configuration information (described herein) which can be sent to the remote UE by the relay and/or network. The below describes the relay UE calculation of the paging transmission window. Without loss of generality, the remote UE can perform the same behavior to determine its monitoring window.

A relay UE may determine a new transmission window for relaying of the paging message and/or send the computed window, or an indication of the change in the computed window to the remote UE:
 a. Upon establishment of a PC5-RRC connection with the remote UE.
 b. Upon a change of the computed window from a previous computation, possibly by a certain (pre)configured amount.
  i. For example, the relay UE may send the computed window to the remote UE if it changes by at least X slots, where X may be (pre)configured or predefined.
  ii. For example, a change of the computed window may result from a change in any of the parameters mentioned above for computing the start and/or end and/or duration of the window.
 c. During one or each of the paging message transmission windows.
  i. For example, the relay UE may send the computed window or an offset at each SL paging window, or each set of slots associated with the Uu paging occasion.
  ii. For example, the relay UE may send the computed window or an offset only at the SL paging window if the computed window has changed by a certain amount.

A remote UE, upon reception of the paging window from the relay and/or computation of the paging window at the remote UE, may apply the new computed SL paging window at the next window time or next remote UE PO.

A relay UE may determine the starting and/or ending slot and/or duration of the paging transmission window relative to the PO/PF of one or more connected remote UEs based on one or more of the following factors:
 a. Beam pattern/configuration at the relay UE.
  i. For example, the relay UE may determine the starting SL slot to be a (pre)configured number of slots following the first/last possible beam on which the relay can receive paging for the remote UE in the remote UE's PO. For example, the UE may adopt such starting slot when configured in RRC_IDLE/RRC_INACTIVE.
  ii. For example, the relay UE may determine the starting SL slot to be a (pre)configured number of slots before/following the current (best) beam used by the relay UE when communicating with the network. For example, the UE may adopt such starting slot when configured in RRC_IDLE/RRC_INACTIVE.
  iii. For example, the relay UE may determine the starting slot as a (pre)configured number of slots before/after the first/last PDCCH monitoring occasion of a PO.
  iv. For example, the relay UE may determine the starting slot from any of the pagingSearchSpaceID or nrofPDCCH-MonitoringOccasionPerSSB-InPO RRC parameters, or any RRC parameters which define the paging occasion configuration at the relay UE.
 b. Relay UE scheduling mode.
  i. For example, the starting slot may be computed differently depending on the scheduling mode of the relay UE. For example, the relay UE may add a first offset (e.g. a NW configured offset) when configured in mode 1, and may add a second offset (e.g. a UE determined offset) when configured in mode 2.
 c. RRC state of the relay UE.
  i. For example, the starting slot computed by a relay UE in RRC_CONNECTED may be relative to the current/best beam for the relay UE. For example, the starting slot computed by a relay UE in RRC_IDLE/RRC_INACTIVE may be relative to the first/last beam in which the relay UE can receive paging associated with a specific PO. Alternatively, the relay UE can define it based on a (pre)configured beam number between the first and last beams.
  ii. In one solution, the relay UE compute/inform the remote UE of the starting point for both the RRC_CONNECTED case and the RRC_IDLE/INACTIVE case, and can later indicate to the remote UE the current RRC state. The remote UE may determine the starting slot based on the current RRC state of the relay UE.
  iii. In one solution, a relay UE may compute an offset to a previously computed starting slot. The relay UE may determine such offset based on a change in the best/current beam measured by the relay UE. The relay UE may send the offset to the remote UE, possibly during the SL monitoring period. The remote UE may apply such offset to determine the starting slot of the SL paging period for the next PO.
 d. Number of attached remote UEs, possibly associated with the same PO.
  i. For example, the relay UE may configure a number of (additional) slots in the SL paging window for each attached remote UE associated with the same PF/PO. Specifically, the relay UE may scale the size of the SL paging window based on the number of attached remote UEs associated with the PO.
e. Number of POs in a paging frame, possibly associated with remote UEs.
  i. For example, the relay UE may configure the starting slot and/or the duration of the SL paging window based on the number of POs in a paging frame and/or the number of monitoring occasions in a PO/paging frame associated with remote UEs which are attached to the relay UE. For example, the relay UE may configure the starting slot to occur following the PO of one or more remote UE if only one PO in the PF is associated with an attached remote UE. Alternatively, the relay UE may configure the starting slot to occur following the paging frame if there are more than one PO in the PF that are associated with at least one remote UE attached to the relay.
  ii. For example, the relay UE may configure the starting slot at a different offset relative to the PO/PF depending on the configured value of Ns (the number of POs configured per paging frame.
f. Sensing configuration/sensing results at the relay UE.
  i. In one solution, the relay UE may compute a starting slot based on the sensing configuration and/or sensing results. In another solution, the relay UE may compute the length of the SL paging window based on the sensing configuration and/or sensing results.
    1. In one example, the relay UE may determine the starting slot based on whether the relay UE is configured with full sensing or partial sensing. Specifically, the relay UE can use a first offset from the PO for the starting slot when configured with full sensing, and may use a second offset from the PO for the starting slot when configured with partial sensing. The second offset may be determined by the partial sensing configuration. Specifically, the second offset may be determined based on the moment in time in which the UE has sufficient sensing results for transmission.
    2. In one example, the relay UE configured in full sensing may determine the starting slot based on a UE capability. The relay UE configured in partial sensing may determine its starting slot from the value of K (the number of periods of the partial sensing results to use) and/or T_sep (the period or separation between the sensing occasions) and/or T_async (the minimum amount of sensing time required immediately before transmission). For example, the UE may be (pre)configured with minimum required values for these parameters, and may derive the starting slot as the first slot for allowable transmission to achieve the minimum sensing results.
    3. In one example, the relay UE may compute the length of the SL paging window based on recent resource selection results, possibly where those resource selection results are specific to resource selection applied for transmission of paging, possibly in the SL paging transmission window associated with the PO to which the UE is currently determining the length, such as:
      (a). The amount/percentage of resources determined as available based on resource selection.
      (b). The SL RSRP threshold used to determine the required target available number of resources to continue with resource selection.
      (c). The average number of available/occupied resources determined during resource selection.
g. Measured CBR at the relay UE.
  i. For example, the relay UE may determine the length of the SL paging window based on the measured CBR. For example, the relay UE may be (pre) configured with a mapping of CBR or CBR range to SL paging window length.
h. The priority of the LCHs configured at the relay UE (e.g. for RRC_INACTIVE scenario).
  i. For example, the relay UE may configure an earlier starting slot and/or a shorter SL paging window if it is configured with one or more relayed LCH having a higher priority.
h. The buffer status at the relay UE, or measure of the relaying load at the relay UE.
  i. For example, the relay UE may configure the starting slot based on the current buffer status of relayed logical channels, possibly associated with other UEs (e.g. not in IDLE/INACTIVE).
  ii. For example, the relay UE may configure a different starting slot and/or window duration depending on the number of remote UEs, possibly in RRC_CONNECTED.
I. The relay scheduling mode (i.e. mode 1 or mode 2).
  i. For example, a relay UE in mode 1 may use a NW defined value of the starting slot and/or duration. On the other hand, a relay UE in mode 2 may define the values of the starting slot and/or duration based on other solutions mentioned herein (e.g. sensing configuration, etc.).

Relay UE/WTRU Extends the SL Time Window for Paging Transmission.

In one solution, a relay UE may extend one or more instances of the SL time window for paging transmission to one or more remote UEs, possibly associated to one PO or PF. Specifically, the relay UE may perform a SL transmission to one or more remote UE in order to extend the duration of the SL time window for transmission, possibly in the case the relay UE was unable to transmit the received paging message in the original time window.

A relay UE may trigger such transmission if the time window has expired or is about to expire and the relay UE has a pending paging message to transmit. A relay UE may trigger such transmission based on the expiry of a timer (e.g. related to the duration of the window)—whereby the paging message has not been transmitted when the timer expires. A relay UE may trigger such transmission if transmission of the paging message is not possible, during the window, as a result of congestion control. A relay UE may transmit such message if it performs relay selection with a first window size, and the relay selection fails. The relay UE may then perform relay selection with a second window size. The relay UE may perform transmission of the extension message despite limitation due to CBR. A relay UE may trigger such transmission as a result of missing the paging transmission as a result of prioritizing UL over SL, at the time in which the paging was originally scheduled. The relay UE may extend the time window by a (pre)configured amount following successful transmission of the extension message. The relay UE may extend an inactivity timer associated with transmission to one or more remote UEs as a result of transmission of the extension message.

The extension message may be any of the following transmissions:
a. SL MAC CE.
b. A dedicated/standalone SCI message.

c. A SL RRC message.

d. A SL channel state information (CSI) report, possibly unsolicited by the remote UE.

e. A SL wakeup signal or similar SL signal used for indicating the need, at the remote UE, to monitor SL on a specific DRX period (on-duration).

The extension message may indicate the number of slots by which to extend the window, from the initial planned end of the window, or from the reception of the message. Alternatively, such number of slots may be (pre)configured or exchanged between the UE (e.g. in the unicast link establishment/configuration).

Reception of the extension message by the remote UE may extend the expected SL paging window duration. Reception of the extension message by the remote UE may result in the resetting, by the remote UE, of an inactivity timer, for example.

Relay UE/WTRU Determines Whether to Drop/Delay a Paging Transmission on SL.

In an alternate solution, a relay UE may drop or delay transmission of a paging transmission on SL if the paging transmission on SL was not performed within the SL paging window. Specifically, the relay UE may be unable to perform transmission on SL during the SL paging window and/or may be unable to transmit an extension message. In such case, the relay UE may drop the paging message. Alternatively, the relay UE may maintain the paging message pending and transmit it during the next SL paging window, possibly associated with the same Uu PO/PF. A UE may further determine whether to drop or delay the paging depending on:

a. The CBR.

b. The QoS and/or SLRB configuration at the remote UE.

c. The RRC state of the relay and/or remote UE.

d. The time until the next SL paging window.

Specifically, a UE relay UE may start a timer upon initiation of the SL paging transmission window. If the paging message is not transmitted at the expiry of the timer, the relay UE may drop the message or delay it until the next SL paging transmission window for that message. The relay may drop the paging message if the remote UE does not have any SLRBs configured for high QoS or requiring the delay of the paging message to the next window.

Relay UE/WTRU Transmits the Paging Message Using Mode 1/Mode 2.

A relay UE in mode 2 may trigger a resource selection, for the purposes of transmitting a paging message over sidelink, upon any of the following events:

a. The relay UE receives a Uu paging message in a PO associated with one or more of the remote UE which are PC5-RRC connected.

b. The relay UE receives a Uu paging message in a PO, where one of the identified UEs in the paging message is for one of the connected PC5-RRC connected remote UEs.

c. The relay UE receives a Uu paging message in a PO and receives an additional indication from the network that the paging message is for one of the connected PC5-RRC connected remote UEs.

i. For example, the relay UE may receive such indication as a set of L2 IDs in an embedded paging message.

ii. For example, the relay UE may receive such indication as a separate RRC message, or MAC CE, possibly received in the same slot, the same PO, or within some time of the reception of the actual paging message.

iii. For example, the relay UE may receive such indication in the DCI. For example:

1. The relay UE may receive an indication in DCI that the paging message scheduled in PDSCH is relevant to relaying, or should be considered for relaying by a UE that is configured for relaying.

A UE which receives the remote UE ID(s) from the network along with the paging and/or the indication may trigger resource reselection.

a. Upon reception of an active paging indication from the network where a PO associated with an attached remote UE is indicated as having a paging message expected.

i. The relay UE may trigger resource selection immediately.

ii. Alternatively, the relay UE may trigger resource selection at some later time instance prior to the occurrence of the PO/PF, or SL paging window.

A relay UE may use the defined SL transmission window as the parameters (e.g. T1/T2) for resource selection upon trigger of resource selection.

In another alternative, the relay UE may trigger transmission of SL UE assistance information upon reception of paging from Uu (in a PO associated with a remote UE) or upon reception of the active paging indication from the network. The relay UE may provide information related to the SL paging window (e.g. periodicity, location/offset) in the UE assistance information. The relay UE may further indicate in the UE assistance information that the SL configured grant (CG) is being requested for forwarding of the paging message. The relay UE may further indicate in the UE assistance information the specific PF/PO of the paging that is expected to be received by the relay UE that requires relaying. Such SL configured grant may be provided in a temporary fashion (e.g. it may be provided for a preconfigured/predefined number of DRX cycles).

In another alternative, the relay UE may trigger a scheduling request (SR) upon reception of paging from Uu (in a PO associated with a remote UE) or upon reception of the active paging indication from the network. Such SR could be dedicated for indicating the need to relay a paging message. Separate SR may be configured for transmission of paging and for transmission of SI indication and/or PWS. Alternatively, the relay UE can be configured with multiple SR resources/configurations and may select the SR configuration which is associated with the PF/PO of the associated remote UE, or of the paging message to be relayed. A relay UE may trigger such SR if it does not have SL resources, potentially in the SL paging transmission window, for transmitting the paging message. Whether the relay UE triggers SR may depend on whether the relay UE has a sidelink grant which falls within the configured paging forwarding window. If a sidelink grant is not present, the relay UE may trigger SR. Whether the relay UE triggers SR may depend on the type of paging received. For example, if the paging is marked as high priority, or if the paging message is PWS indication, the relay UE may trigger SR, otherwise, it may trigger SR only if the UE does not have a SL grant within the paging forwarding window.

In another alternative, the relay UE may receive a CG or a CG activation along with a Uu paging message. Such may be used by a relay UE in RRC_CONNECTED. Such CG may be predefined/preconfigured to have its resources occur within the SL paging transmission window.

Relay UE/WTRU Informs the Remote UE/WTRU of an Upcoming Paging (in the SL Paging Window) Using a WUS-Like Signal.

In one solution, a relay UE may transmit a Wakeup Signal (WUS) like signal on sidelink when the relay UE receives or expects to receive paging for a remote UE, set of remote UEs, or associated with a paging occasion.

In one solution, a relay UE may transmit the WUS following reception of the active paging indication message from the network. Specifically, the relay UE may determine whether to transmit the WUS to one or more remote UE based on whether the active paging indication from the network indicates a paging message will be sent for a particular UE/PO, and the relay UE determines that the UE is PC5-connected to the relay or the PO is associated with a relay which is PC5-connected to the relay.

In another solution, a relay UE may transmit a WUS following reception of the active paging message from the network. For example, the relay UE may transmit a WUS if the paging message is received at some time prior to the expected remote UE's PO (e.g. for an RRC_CONNECTED relay UE).

A remote UE may be configured with a time window for receiving a WUS. Specifically, the remote UE may determine the time window from the relay UE. Specifically, the remote UE may determine the time window based on its own PO, or the PO of the relay UE, using similar mechanisms defined herein for determining the start of the SL transmission window. A relay UE may determine the time resources for transmission of the WUS relative to its own paging occasion, relative to the planned reception time of the active paging indication from the network, or at some (pre)configured or predefined time resources associated with the remote UE's DRX cycle.

In another solution, a relay UE may transmit a single WUS-like signal on SL, potentially to all PC5-CONNECTED remote UEs. Such signal may indicate the specific POs and/or PFs which are expected to have active paging. Such signal may indicate the specific remote UE's that should monitor sidelink during the defined SL paging window in order to potentially receive paging. The relay UE may determine the contents of the SL signal based on the received active paging indication received from the network. A remote UE, upon reception of the WUS-like signal on SL, may determine whether to monitor SL on the defined SL paging window associated with the PO/PF depending on whether the WUS-like signal indicates that PO/PF will contain a paging message.

Methods for Determining Whether/when to Forward a Received Paging Message.

Relay UE/WTRU Provides Linking of the Remote UE/WTRU IDs to the NW.

Given the potential security issue (described herein), a method is needed for the relay/remote UE to provide a linking of the remote UE ID for paging (i.e. 5G-S-TMSI, I-RNTI) with the L2 ID(s) used by the relay UE to address the remote UE, and in a method which hides the remote UE ID from the relay UE.

In one method, the remote UE may include the source/destination L2 ID to the network along with its connection establishment/resume (which provides the paging UE ID). In such case, the network can establish the linking between the IDs. The remote UE may further trigger such procedure or may trigger transmission of a Uu RRC message upon change of the L2 ID by upper layers (e.g. as a result of UE ID refresh procedure for L2 IDs defined for upper layers).

In another method, the relay UE may include the source/destination L2 ID to the network along with the reception of any message associated with the SL RLC channel associated with signaling radio bearer (such as SRB0) transmissions by the remote UE. Specifically, the relay UE may relay any messages on the SL radio link control (RLC) channel dedicated to SRB0 to the network, and may include the L2 source/destination ID associated with the unicast link (between the relay and remote UE) in the relayed message.

Relay UE/WTRU Receives Separate UE/WTRU IDs with Paging Message.

In one solution, a relay UE may receive, in addition to the paging message on Uu, a list of L2 source/destination IDs corresponding any remote UEs being paged in the paging message. A relay UE may, if the paging message received via Uu contains at least one source/destination ID associated with a remote UE the relay is currently connected to, forward the paging message over PC5 over the unicast link. Otherwise, the relay UE may not forward the paging message, or may forward the paging message using broadcast/groupcast to all of the remote UEs, possibly associated with that PO.

For example, a relay UE in RRC_CONNECTED may receive the list of source/destination IDs in the dedicated RRC message which contains the paging record.

For example, a relay UE in RRC_IDLE/RRC_INACTIVE may receive the list of source/destination IDs.
  a. In a separate transmission within the PO/PF of the remote UE (e.g. using a different RNTI, or using the same P-RNTI used to receive the paging message).
  b. Embedded in the paging record itself.
    i. For example, the paging record may contain additional fields associated with the L2 source/destination ID for each UE in the paging record.

Relay UE/WTRU Defines a Multicast/Groupcast UE/WTRU ID for SL Paging Transmission.

In one solution, a relay UE may use a multicast/groupcast UE ID for transmission of SL paging message. The L2 ID(s) may be provided (reserved) by upper layers specifically for such purpose. Specifically, the relay UE may be configured with a single broadcast/groupcast L2 ID for transmission of paging. Alternatively, a relay UE may have a set of broadcast/groupcast L2 IDs for transmission of paging, each associated with transmission of paging messages that are tied to:
  a. A PF, or group of PFs.
  b. A PO, or group of POs.
  c. A SL paging transmission window.
  d. A value of UE_ID mod K (e.g. K=1024), or similar value which can be used to derive the location of the PO.

In one solution, a relay UE may be assigned a group/pool of L2 IDs and may assign the L2 ID to a specific PO upon PC5-RRC connection with a remote UE. Specifically, a remote UE may provide its PO (or value that can be used to derive the PO, such as UE ID mod k) to the relay UE during sidelink configuration following unicast link establishment with the relay. As a consequence, the relay UE may provide, to the remote UE, an available L2 ID from the pool of L2 IDs, in similar PC5-RRC configuration signaling. The remote UE, upon reception of the L2 ID, may monitor/receive Uu paging for sidelink from groupcast transmissions that use the L2 ID as the destination L2 ID in the message. A remote UE may further determine whether the paging is intended for it by checking the paging message for the paging record (i.e. having its I-RNTI or S-TMSI), as it does in Uu.

In another solution, a relay/remote UE may be (pre) configured with a mapping of L2 ID to PO or information related to PO (e.g. PO index, or UE ID mod k). For example, such mapping may be predefined by a table in the standard. For example, the L2 ID may contain a portion of the PO index, or UE mod K value, which allows one or more POs or UE ID mod K to be mapped to a single L2 ID. For example, such table may be provided by the network (e.g. in SIB). Upon connected with a relay, the remote UE may start to monitor SL for the mapped L2 ID for groupcast transmissions which contain paging. Upon connection to at least one remote UE, the relay UE may perform transmission groupcast transmissions with the relayed paging message with the L2 ID which is associated with the paging record (either based on the PO, PO index, UE ID mod K, etc). The relay UE may further perform such groupcast transmissions only within the SL paging window(s) associated with the PO in which the paging was received.

A UE may use groupcast transmissions in paging under certain circumstances and may forward paging using unicast in other circumstances. The conditions for using unicast or groupcast for forwarding the paging message may be related to any of the following:
a. The RRC state of the relay UE.
  i. For example, the relay UE may send the paging using unicast if the relay is in RRC_CONNECTED and may use groupcast otherwise.
b. The knowledge of the L2 IDs associated with the paging.
  i. For example, if the relay UE receives the L2 source/destination IDs of the UEs being paged in the paging message, the relay may send using unicast, otherwise, it may send with groupcast.
c. The reliability requirements of the paging message.
  i. For example, a high reliability paging message may be transmitted with unicast, and a low reliability paging message may be transmitted with groupcast. The relay UE may determine the reliability of the paging message from:
    1. An indication in the paging message or the paging DCI.
    2. The SLRBs configured with any remote UE associated with the paging message.
    3. The RRC state of any remote UE associated with the paging message.
d. The measured CBR.
  i. For example, if the CBR is above a threshold, the relay UE may use groupcast. Otherwise, the relay UE may forward the paging message using unicas.t
e. The availability of SL grants in the SL paging window.
  i. For example, if the relay UE has sufficient SL grants in the paging window, it may use unicast, otherwise, it may use groupcast.t
f. The size of the paging message, or the number of paging records in the paging message.
g. The number of remote UEs attached to the relay UE.

A relay UE may forward paging messages by unicast or groupcast, depending on whether the received paging message is associated with SI modification/PWS notification, or paging message. Specifically, a relay UE may transmit a groupcast/broadcast message (using the configured L2 ID) for transmission of an SI modification and/or PWS notification, while UE pages and/or PWS notification and/or SI modification may be transmitted using unicast to the specific UE(s) which are being paged. A relay UE may include an SI modification and/or PWS indication in unicast to a UE, and also transmit it in groupcast/broadcast to all of its remote UEs. For example, if the relay UE has a pending SI modification to be transmitted, the relay UE may include the SI modification in any unicast transmission it may have pending to the remote UE (e.g. UE paging forwarding), and also transmit the SI modification in groupcast/broadcast sometime later. The relay UE may transmit the SI modification and/or modified SI in groupcast/broadcast as long as at least N (where N may be 1, or a configured value) remote UEs have not received the SI modification and/or modified SI.

A remote UE may ignore any SI modification indications, or modified SI, received in groupcast/broadcast within the same modification period after having received the SI modification or modified SI in unicast.

Figure 5:
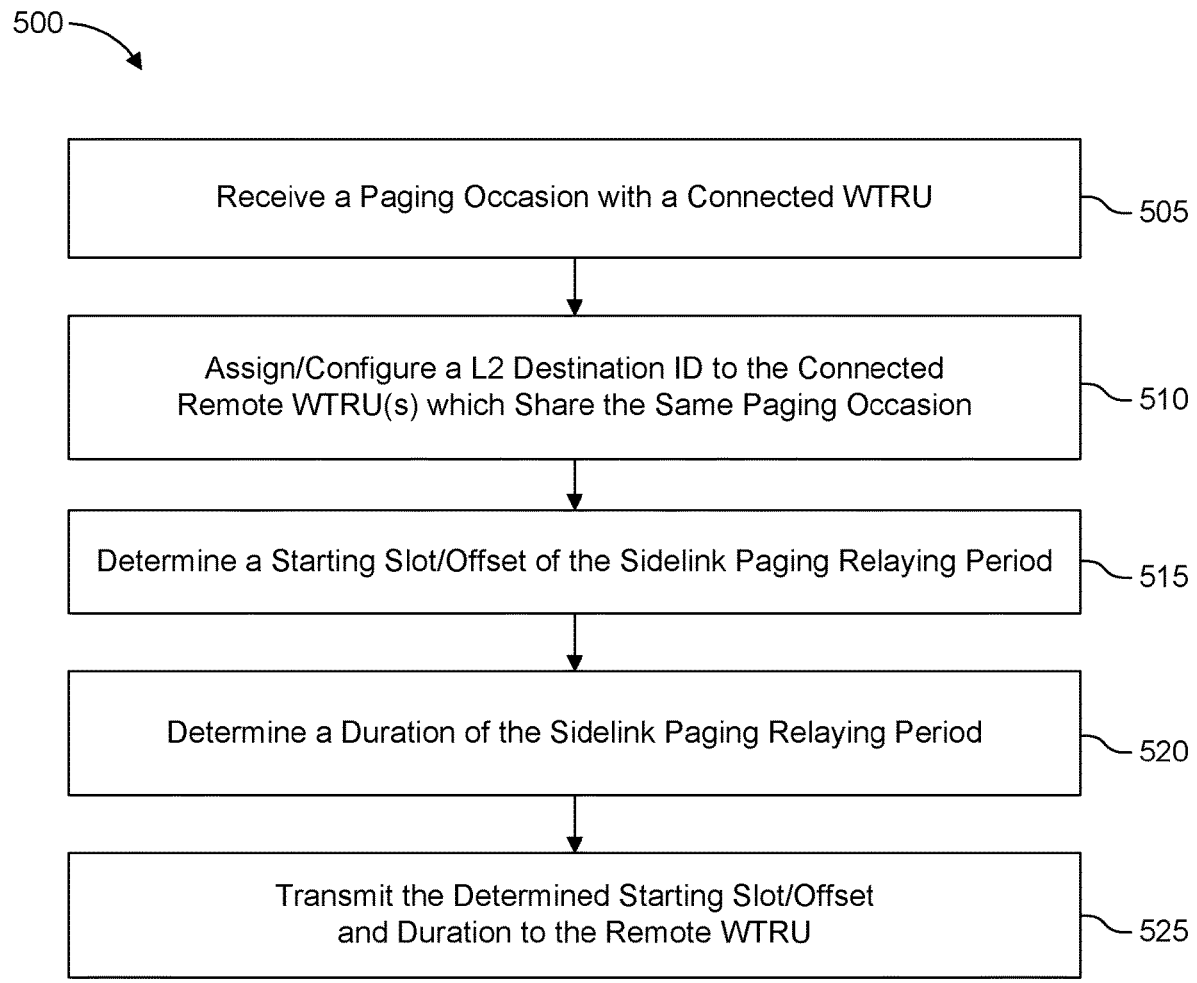
FIG. 5 depicts an example flow diagram for a relay WTRU to compute allowable sidelink slots for relaying of a paging message.

FIG. 5 depicts an example flow diagram 500 for a relay UE/WTRU to determine the allowable SL slots for relaying of a paging message to one or more remote UEs associated to the same PO. In one instance, the relay UE may be in a RRC_IDLE/RRC_INACTIVE state to determine the allowable SL slots for relaying of a paging message to one or more remote UEs associated to the same PO, and may broadcast the relayed paging message to all the remote UEs associated with the PO during those allowable SL slots.

In the example of FIG. 5, at 505, a relay UE receives a paging occasion (PO) for a connected UE. In one instance, the relay UE receives a PO associated with a PC5-RRC connected remote UE (e.g. the remote UE in PC5-RRC communication). The reception of the PO information may be transmitted from a remote UE or a NW connection.

At 510, the relay UE may assign or configure a L2 destination ID to the connected remote UE(s) which share the same paging occasion. Here, the UE may assign or configure for the one or more PC5-RRC connected remote UEs which share the same PO. At 515, the relay UE determines a starting slot/offset of the sidelink paging relaying period. Here, the relay UE may determine a starting slot/offset of the SL paging relaying period with respect to the remote UE's paging occasion. This determination may be based on any one or more of the relay UE's paging search space configuration, the SSB/beam configuration for paging configured at the relay UE, and/or a sensing/partial sensing configuration of the relay UE.

At 520 the relay UE determines a duration of the SL paging relaying period. Here, the relay UE may make the duration determination based on a measured CBR. At 525, the relay UE may send/transmit the determined starting slot/offset and duration to the remote UE. In one instance the remote UE is in PC5-RRC message association with the relay UE.

In one instance, upon reception of a paging message to be relayed on a given Uu PO associated with one or more remote UE, the relay UE may perform mode 2 resource selection to select a SL resource determined by the starting slot/offset and duration. Then, the relay UE may send/transmit the received paging message on the selected resource using the L2 destination ID associated to the PO.

Figure 6:
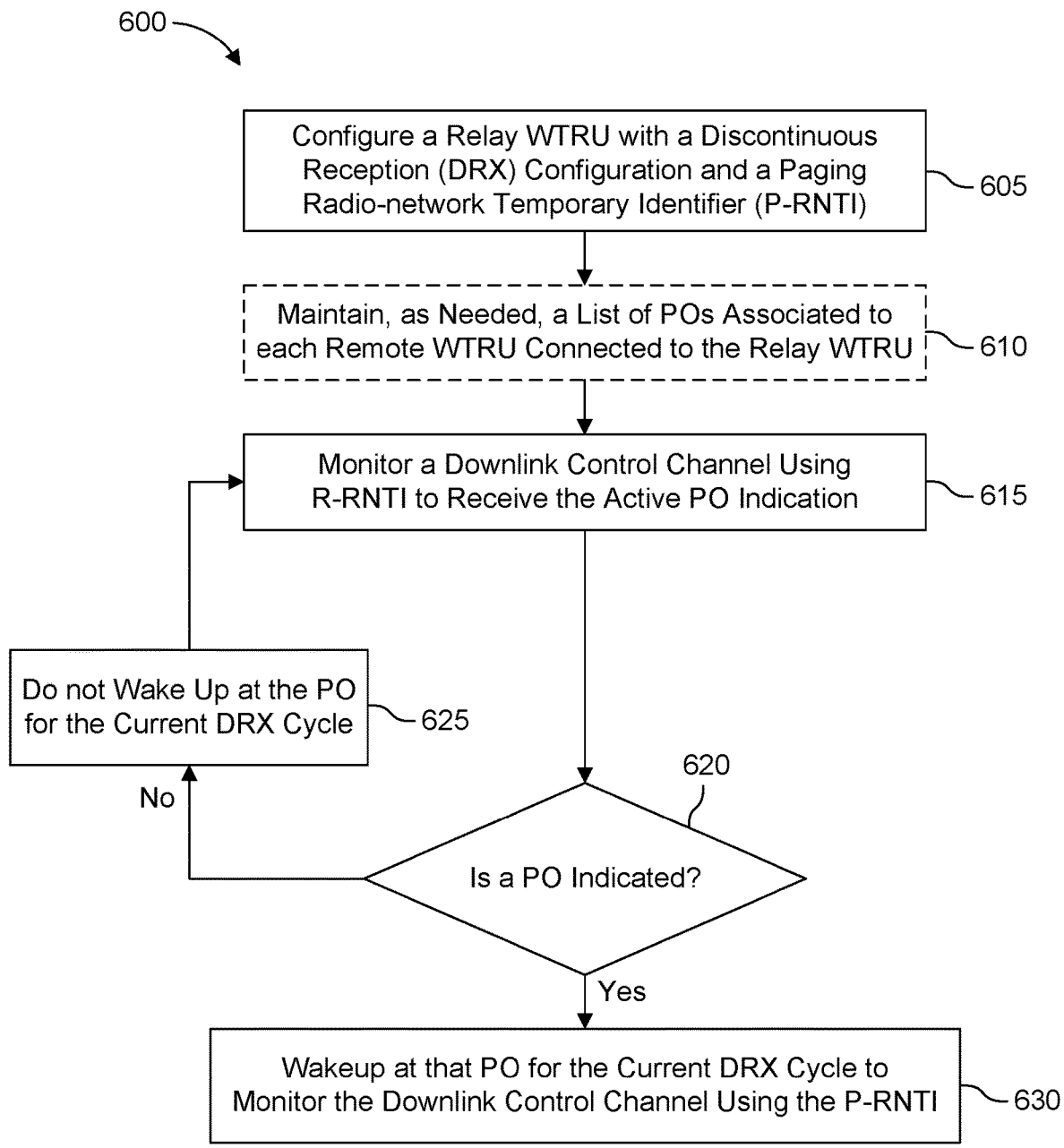
FIG. 6 depicts an example flow diagram for a relay WTRU to determine which of one of the network configured paging occasions to use to wakeup and monitor in a particular DRX cycle.

FIG. 6 depicts an example flow diagram 600 for a relay UE/WTRU to determine in which of the NW configured paging occasions (POs) to wakeup or to monitor in a particular DRX cycle based on the connected remote UEs/WTRUs and an indication of the active POs in the upcoming DRX cycle received during the relay UE's/WTRU's own PO. In one instance, the relay UE/WTRU operates in an RRC_IDLE/RRC_INACTIVE state but has or can establish or re-establish a communication with a remote UE/WTRU using a PC5-RRC connection.

In the example of FIG. 6, at 605, a relay UE/WTRU is assumed to be configured/associated with a DRX configuration and a paging radio-network temporary identifier (P-RNTI). The relay UE/WTRU may use a relay RNTI (R-RNTI) to receive an active PO indication. Optionally, at 610, the relay UE/WTRU may maintain, as needed, a list of POs associated to each remote UE/WTRU connected to the relay UE/WTRU. This maintenance includes the capability to add or delete POs associated with each remote UE/WTRU a that has a PC5-RRC connection to the relay UE/WTRU.

At 615, the relay UE/WTRU may monitor a downlink control channel, such as a PDCCH, using the R-RNTI to receive the active PO indication. At 620 the relay UE/WTRU detects if there is an active PO indication. If no active PO indication is received at 620, then at 625, the relay UE/WTRU does not wake up at the PO for the current DRX cycle of the relay UE/WTRU. If at 620, a PO indication is detected, then at 630, the relay UE/WTRU performs a wakeup at that PO for the current DRX cycle to monitor the downlink control channel, such as the PDCCH, The control channel monitoring uses the relay UE/WTRU R-RNTI.

The procedures of the above descriptive examples, as well as the methods described for the Figures, may be combined without exception unless otherwise explicitly stated. Thus, for example, a set-up or configuration of paging capabilities or DRX information may be cooperatively coupled with reception of SI or paging information by the relay WTRU and subsequent delivery of SI or paging information to one or more remote WTRUs. In a further example of the combination of described features, the characteristics of message structure, delivery, reception, and timing described above may be combined unless otherwise specifically exempted in the description.

Figure 7:
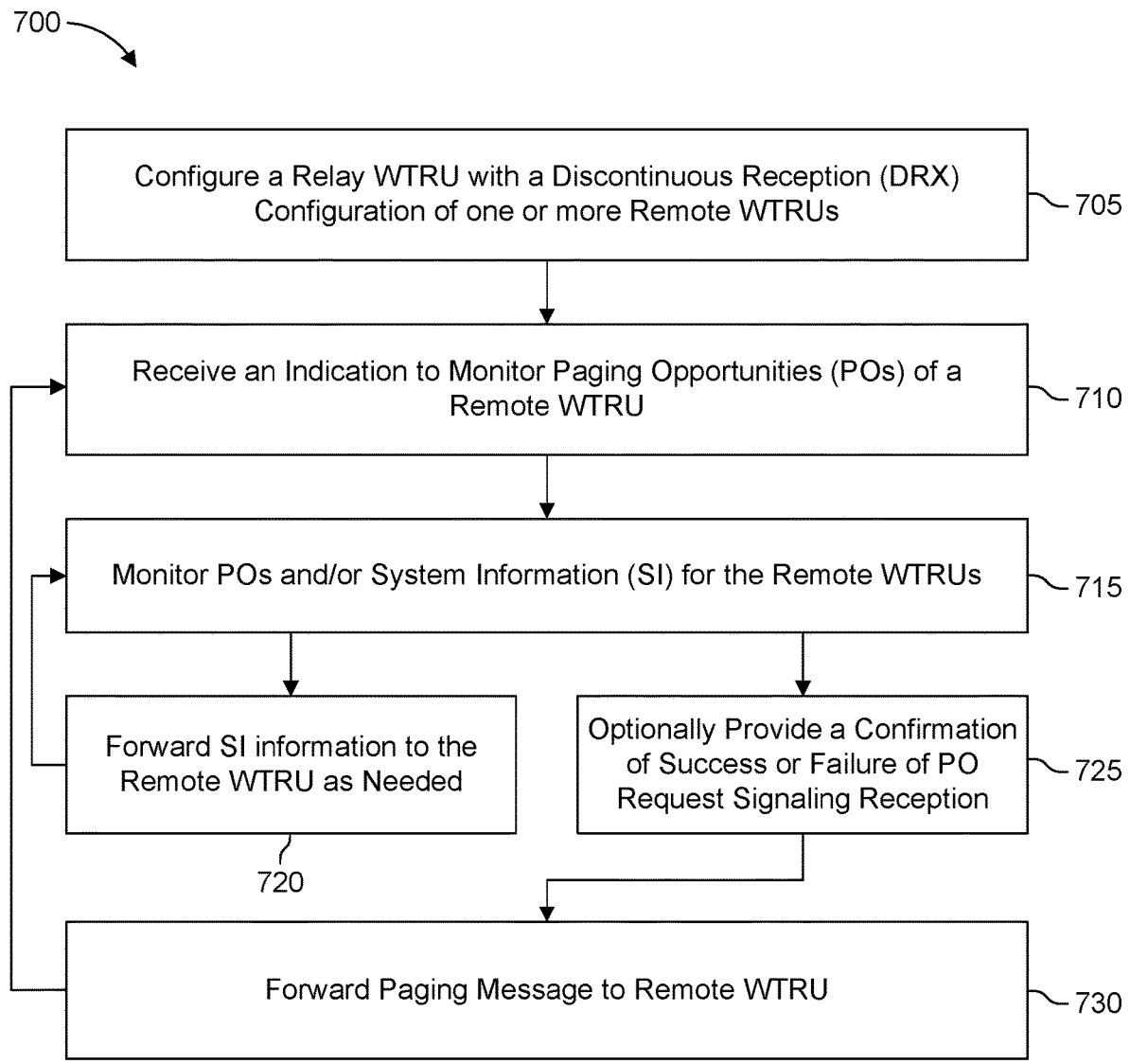
FIG. 7 depicts an example flow diagram for a relay WTRU to process either or both of system information changes and paging opportunities for a remote WTRU.

FIG. 7 depicts an example flow diagram 700 for a relay WTRU to process either or both of system information changes and paging opportunities for a remote WTRU. At 705, the relay WTRU may be configured with a discontinuous reception (DRX) configuration of one or more remote WTRUs. At 710, the relay WTRU may receive an indication to monitor paging opportunities (POs) of at least one of the remote WTRUs. At 715, the relay WTRU monitors POs and/or system information (SI) received by the relay WTRU for at least one of the remote WTRUs. If SI information is received, the relay WTRU may forward the information to the relevant remote WTRU at 720. If PO information intended for a remote WTRU is received by the relay WTRU at 715, then at 725, the relay WTRU may optionally provide a confirmation of success or failure of receipt of that PO information. Assuming successful receipt of the PO information intended for at least one remote WTRU, the rely WTRU may then forward a paging message to the respective remote WTRU at 730.

Figure 8:
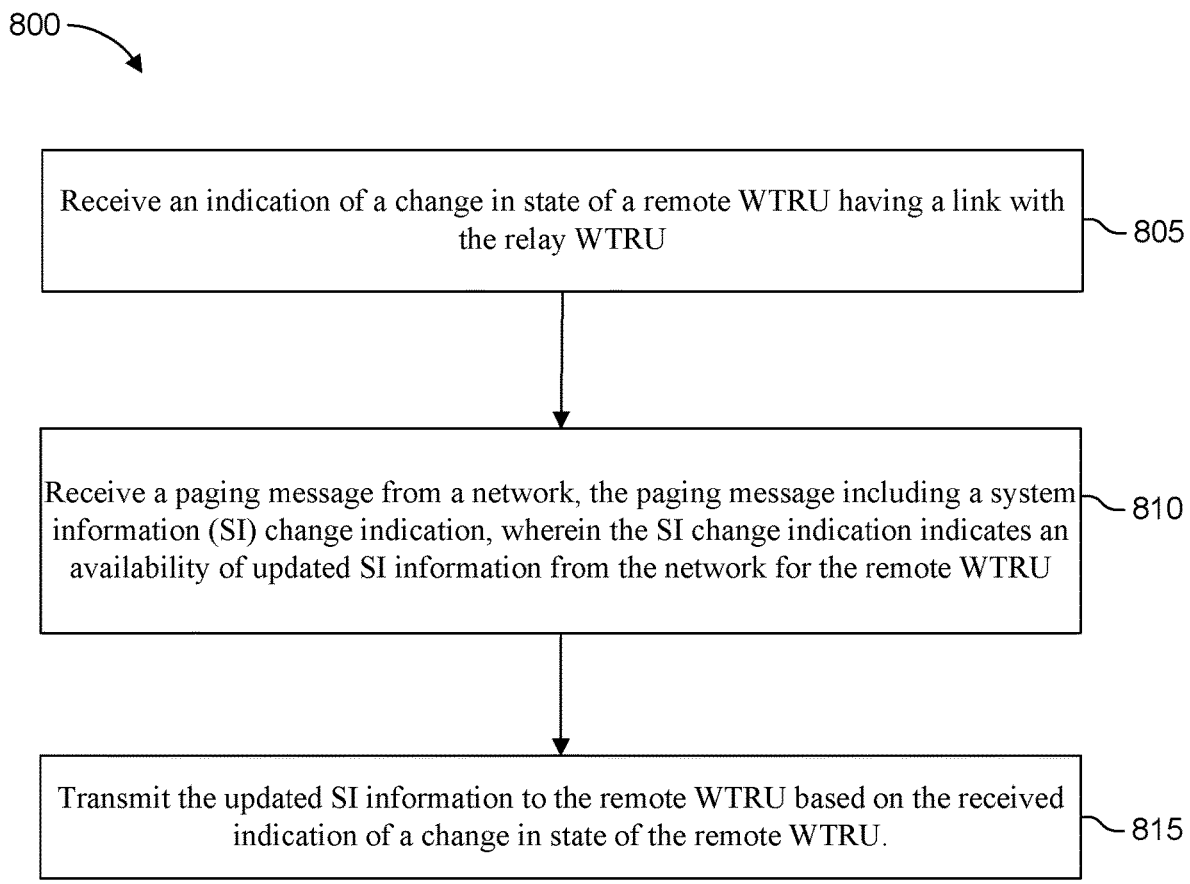
FIG. 8 depicts an example flow diagram for a relay WTRU to transmitting updated system information to a remote WTRU based on a change in state of the remote WTRU.

In a paging environment as presented hereinabove, combinations of solution features are possible. For example, FIG. 8 depicts a method 800 wherein a relay UE/WTRU may forward system information (SI) change information to a remote UE/ETRU based on an indication of a state of the remote UE/WTRU. At 805, a relay UE may receive an indication of a change in state of a remote WTRU having a link (such as a PC5-RRC link that supports paging) with the relay UE. for example, the relay UE may receive the indication of a change in state of a remote UE by receiving a PC5 RRC message from the remote UE. The received PC5 RRC message/signaling indicates to the relay UE, either directly or by implication, a RRC state or state change of the remote UE.

At 810, the relay UE may receive a paging message from the network. The paging message may contain a system information (SI) change indication, wherein the SI change indication indicates an availability of updated SI information from the network for the remote UE. The updated SI information is the actual SI information. The network can inform the relay UE of SI information change via an indication in a paging message. The paging message from the network may be a paging short message. The updated SI information available from the network is the actual SI information whereas the SI change indication is only an indication in a paging message that updated SI information is available from the network.

At 815, the relay UE may transmit the updated SI information to the remote UE based on the received indication of a change in state of the remote UE. For example, the relay UE transmits the updated SI information to the remote UE if the received indication of a change in state of the remote UE is associated with sending the updated SI information to the remote UE. In a further example, the relay UE transmits the updated SI information to the remote UE if the received indication of a change in state of the remote UE indicates that the remote UE has changed to or is currently in an RRC IDLE or RRC INACTIVE state. In the RRC IDLE or RRC INACTIVE state, the remote UE relies on the relay UE to provide the update SI data.

Alternatively, if the relay UE determines that the remote UE is in RRC Connected state and an SI change indication is received in a paging message, then the relay UE may forward the SI change indication to the remote UE instead of forwarding the updated SI data itself. Thus, the relay UE may transmit the SI change indication to the remote UE if the received indication of a change in state of the remote UE indicates the remote WTRU has changed to a connected state. In this instance (of RRC CONNECTED state), the remote UE may acquire the updated SI data/information directly itself from the network.

Figure 9:
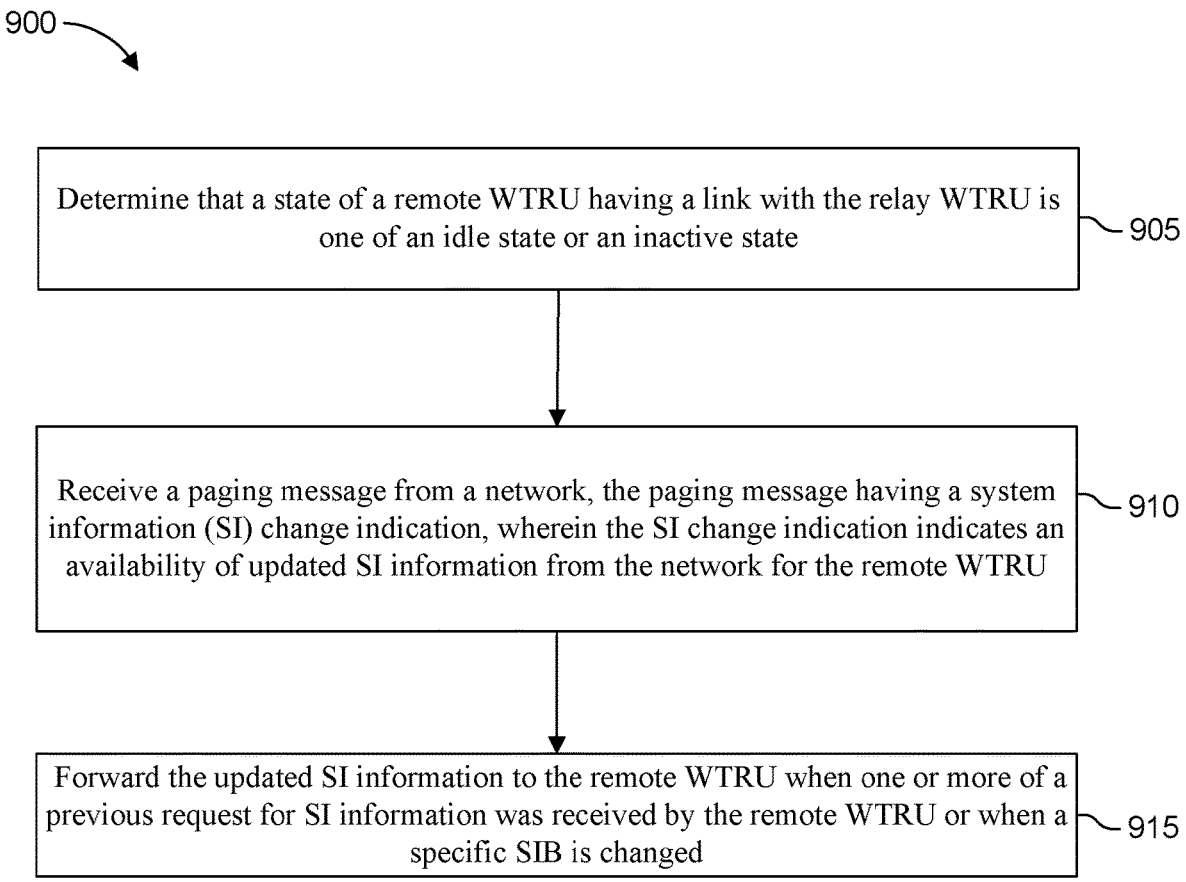
FIG. 9 depicts an example flow diagram for a relay WTRU to forward updated system information based on the type of information received.

Another example of a combination of features discussed hereinabove is presented in FIG. 9. In the example method 900 of FIG. 9, system information type, such as system information block (SIB) type, may be used to forward SI change information to a remote UE/WTRU from a relay UE/WTRU when the remote UE is in an idle or inactive state. At 905, the relay UE has a link (such as a PC5-RRC link that supports paging) with a remote UE. The relay UE may determine that a state of a remote UE is one of an idle state or an inactive state. The state of the remote UE may be determined by monitoring signaling of the remote UE. For example, the relay UE may determine the state of the remote UE by RRC messages/signaling. As expressed hereinabove, the state of the remote UE may be determined either directly from RRC signaling or implicitly using, for example, PC5 RRC signaling. At 910 in FIG. 9, the relay UE may receive a paging message from the network. The paging message may include a system information (SI) change indication. The SI change indication indicates an availability of updated SI information from the network for the remote UE. At 915, the relay UE may forward the updated SI information to the remote UE based on one or more of a previous update of SI information received by the remote UE or a type of SI information change. Thus, the forwarding of the updated SI information to the remote WTRU is performed when one or more of a previous request for SI information was received from the remote WTRU or when a specific SIB is changed. In one example, the relay UE may forward the actual SI update information (acquired from the network) when the relay UE receives an indication that an update to SIB information that the remote UE previously received is available. This forwarding is based on select SI information types. For example, selected types of SIB updates for a remote UE that had been previously received by the remote UE may be a type of SI update that the remote UE has an interest in receiving and thus may be forwarded to the remote UE from the relay UE. In another example, a specific type of SIB (or a specific SIB) update may be indicated to the relay UE intended for the remote UE. One type or specific SIB update that may be forwarded to the remote UE from the relay UE is SIB1. This actual SIB information may be forwarded to the remote UE either in part or in full by the relay UE. Forwarding in the above examples is dependent on the remote UE being in an idle or inactive state.

Figure 10:
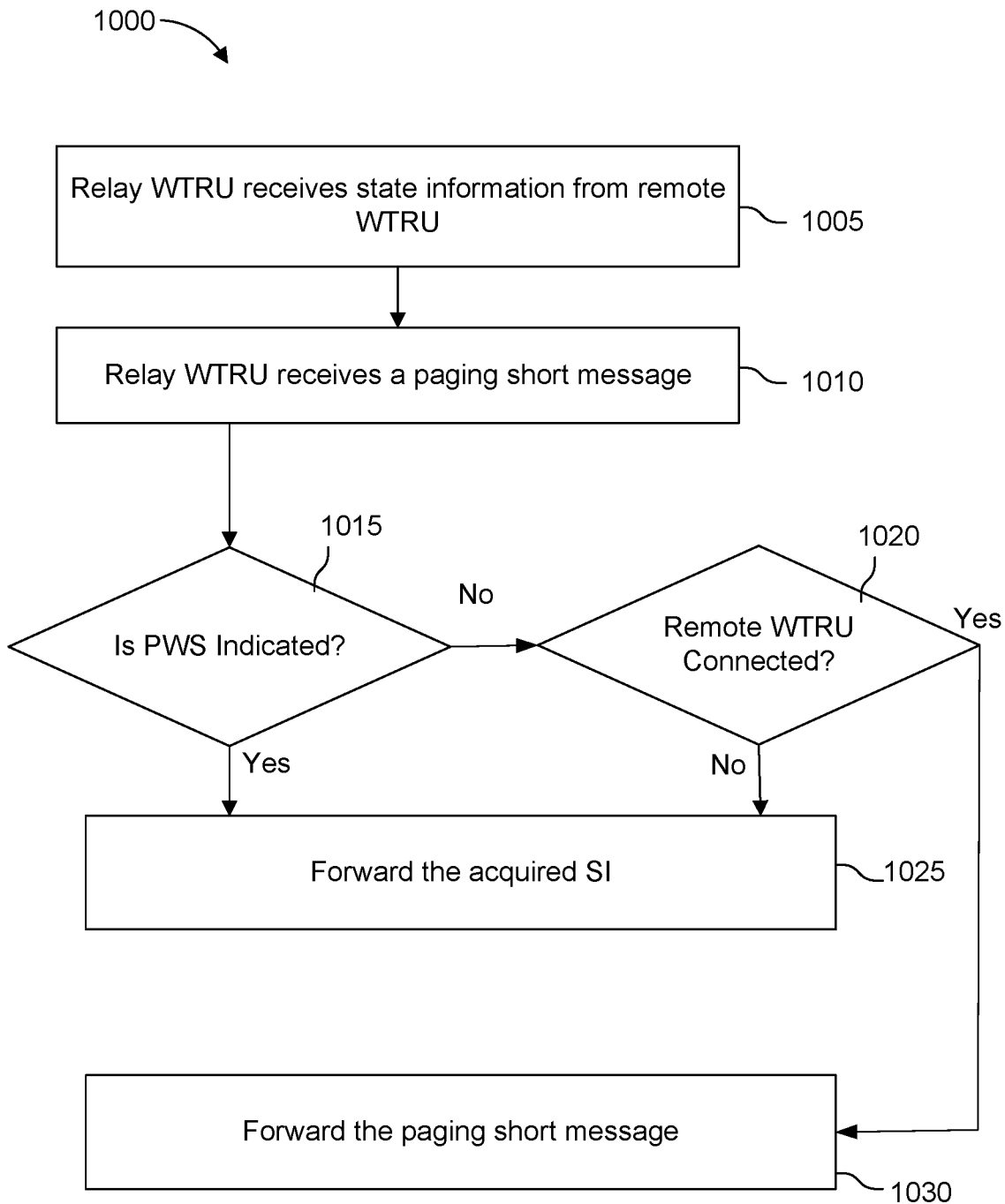
FIG. 10 depicts an example flow diagram for a relay WTRU processing a paging short message that contains a public warning system indication.

Another example of a combination of features discussed hereinabove is presented in FIG. 10. In the example method 1000 of FIG. 10, a paging message containing both a PWS and a SI information update indication is processed by the relay UE/WTRU. At 1005 in FIG. 10, a relay UE/WTRU receives state information from the remote UE/WTRU. As indicated herein above, the relay UE may determine the state of the remote UE directly using RRC signaling or the state of the remote UE may be determined by implication via monitoring RRC signaling of the remote UE. At 1010, the relay UE receives a paging short message. A paging short message may include a PWS indication and a SI change indication. At 1015, the relay UE determines if the received short message contains a PWS indication. If the received paging message has a PWS indication, then the relay UE, at 1025, forwards the actual (acquired from the network) SI update information to the remote UE. If at 1015, a PWS indication is not present in the paging short message, then the relay UE determines, at 1020, if the remote UE is in a connected state. If the remote UE is not in the connected state, such as the remote UE determined to be in the idel or inactive state, then, at 1025, the relay UE forwards the actual (acquired from the network) SI update information to the remote UE. If at 1020, the remote UE is determined to be in a connected state, then the relay UE may forward the received short message to the remote UE. Upon the positive decision at 1020, the remote UE, being in a connected state, can acquire the updated SI information (data) from the network.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU")

and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect.

What is claimed:

1. A wireless transmit/receive unit, WTRU, comprising circuitry configured to:
   establish a connection with a relay WTRU;
   establish a connection with a network via the relay WTRU;
   receive a radio resource control, RRC, indication for a state change of the WTRU from a first RRC state to a second RRC state, wherein the first RRC state is different from the second RRC state;
   change state from the first RRC state to the second RRC state;
   in response to the state change, transmit paging information to the relay WTRU, wherein the paging information comprises WTRU discontinuous reception, DRX, cycle information when the second RRC state is either an RRC Idle state or an RRC Inactive state, wherein:
     when the second RRC state is the RRC inactive state, the transmitted DRX cycle information is a minimum value of (i) a non-access stratum configured DRX cycle of the WTRU, and (ii) an RRC configured DRX cycle of the WTRU, and
     when the second RRC state is the RRC idle state, the transmitted DRX cycle information is to be the non-access stratum configured DRX cycle of the WTRU.

2. The WTRU of claim 1, wherein content of the DRX cycle information transmitted to the relay WTRU depends on the second RRC state of the WTRU.

3. The WTRU of claim 1, wherein in response to the state change, wherein the second RRC state is the RRC Idle state, transmit paging information of the WTRU to the relay WTRU, the paging information comprising non-access stratum configured DRX cycle information.

4. The WTRU of claim 1, wherein in response to the state change, wherein the second RRC state is the RRC Inactive state, transmit paging information of the WTRU to the relay WTRU, the paging information comprising WTRU DRX cycle information either of (i) a non-access stratum configured DRX cycle information of the WTRU, or (ii) a radio access network configured DRX cycle information of the WTRU, wherein the DRX information transmitted is a minimum value of (i) or (ii).

5. The WTRU of claim 1, wherein in response to the state change, wherein the second RRC state is an RRC Connected state, transmit paging information that does not include DRX information of the WTRU.

6. The WTRU of claim 1, wherein the connection with the relay WTRU is a PC5 RRC link and the connection with the network via the relay WTRU is a Uu link.

7. The WTRU of claim 1, wherein a transmission from the WTRU to the relay WTRU further comprises a WTRU identifier (ID) comprising one of a Radio-Network Temporary Identifier (RNTI) or a Temporary Mobile Subscriber Identifier (TMSI).

8. A method performed by a wireless transmit/receive unit, WTRU, the method comprising:
establishing a connection with a relay WTRU;
establishing a connection with a network via the relay WTRU;
receiving a radio resource control, RRC, indication for a state change of the WTRU from a first RRC state to a second RRC state, wherein the first RRC state is different from the second RRC state;
changing state from the first RRC state to the second RRC state;
in response to changing state, transmitting paging information to the relay WTRU, wherein the paging information comprises WTRU discontinuous reception, DRX, cycle information when the second RRC state is either an RRC Idle state or an RRC Inactive state.

9. The method of claim 8, wherein transmitting paging information to the relay WTRU wherein the second RRC state is the RRC Idle state, comprises transmitting non-access stratum configured DRX cycle information.

10. The method of claim 8, wherein transmitting paging information to the relay WTRU, wherein the second RRC state is the RRC Inactive state, comprises transmitting WTRU DRX cycle information either of (i) a non-access stratum configured DRX cycle information of the WTRU, or (ii) a radio access network configured DRX cycle information of the WTRU, wherein the DRX information transmitted is a minimum value of (i) or (ii).

11. The method of claim 8, wherein transmitting paging information to the relay WTRU further comprises transmitting paging information that does not include DRX information of the WTRU when the second RRC state is an RRC Connected state.

12. The method of claim 8, wherein transmitting paging information to the relay WTRU a further comprises transmitting a WTRU identifier (ID) comprising one of a Radio-Network Temporary Identifier (RNTI) or a Temporary Mobile Subscriber Identifier (TMSI).

13. The method of claim 8, wherein establishing the connection with the relay WTRU comprises establishing a PC5 RRC connection with the relay WTRU, and wherein establishing the connection with the network comprises establishing a Uu connection with the network.

* * * * *